(12) United States Patent
Pollock et al.

(10) Patent No.: US 6,253,705 B1
(45) Date of Patent: Jul. 3, 2001

(54) HOG FEEDER WITH ADJUSTABLE FEED CONTROL GATES

(75) Inventors: Eugene B. Pollock, Assumption; Hubert Vern Hopley, Irving, both of IL (US)

(73) Assignee: The GSI Group, Inc., Assumption, IL (US)

( * ) Notice: Subject to any disclaimer, the term of this patent is extended or adjusted under 35 U.S.C. 154(b) by 0 days.

(21) Appl. No.: 09/322,620

(22) Filed: May 28, 1999

(51) Int. Cl.[7] ....................................................... A01K 7/06
(52) U.S. Cl. ............................................................... 119/53.5
(58) Field of Search ........................... 119/52.1, 53, 53.5, 119/54

(56) References Cited

U.S. PATENT DOCUMENTS

| | | |
|---|---|---|
| 2,494,950 | 1/1950 | Lee . |
| 4,306,518 | 12/1981 | Herring . |
| 4,385,591 | 5/1983 | Petersen . |
| 4,491,087 | 1/1985 | Herring . |
| 5,010,849 | 4/1991 | Kleinsasser . |
| 5,036,798 | 8/1991 | King . |
| 5,222,460 | 6/1993 | Evans, III . |
| 5,345,894 | 9/1994 | Evans, III et al. . |
| 5,351,649 | * 10/1994 | Badia et al. ........................ 119/53.5 |
| 5,570,656 | 11/1996 | Waldner et al. . |
| 5,603,285 | * 2/1997 | Kleinsasser ............................ 119/53 |
| 5,921,200 | * 7/1999 | Bondarenko et al. .............. 119/52.1 |

* cited by examiner

Primary Examiner—Thomas Price
(74) Attorney, Agent, or Firm—Polster, Lieder, Woodruff & Lucchesi, L.C.

(57) ABSTRACT

A hog feeder with an adjustable gate mechanism is disclosed which comprises a feed hopper for receiving and storing a supply of flowable, dry hog feed to be gravity dispensed from discharge openings in the lower longitudinal portions of the hopper, for consumption by hogs over a length of time. The flow of hog feed from the discharge openings is controlled by a pair of slideable gates, each having a cam actuated adjustment mechanism. The adjustment mechanism includes a number of receiving notches on each side of the hopper corresponding to a filly open gate setting, a fully closed gate setting, and a plurality of intermediate gate settings. Positioning a selection lever within a desired notch shifts the corresponding slideable gate to the selected position by way of a sliding cam arrangement. The sliding cam arrangement transfers lateral motion of the selection lever into vertical motion of the slideable gate, allowing for opening and closing of the discharge openings.

7 Claims, 28 Drawing Sheets

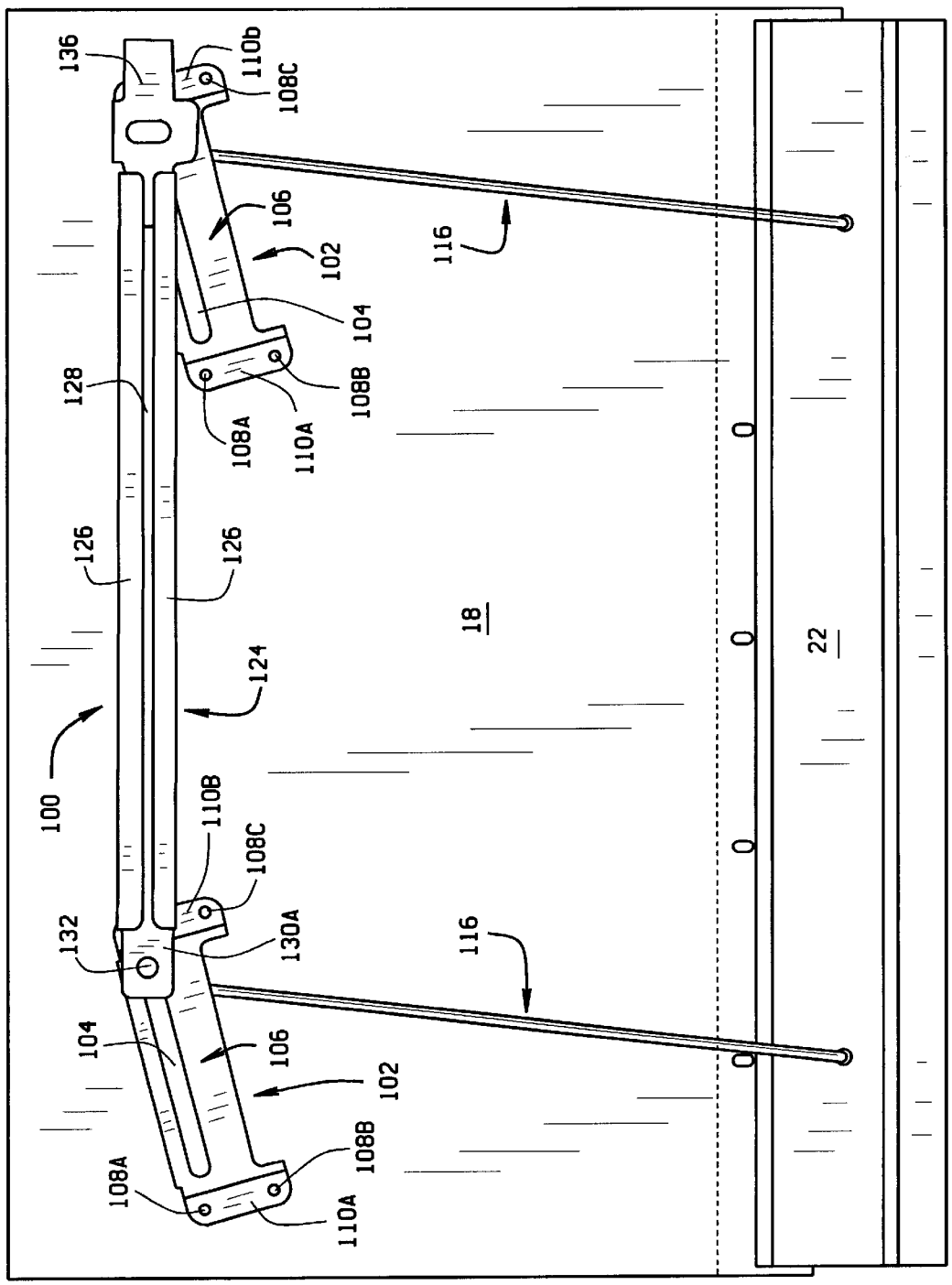

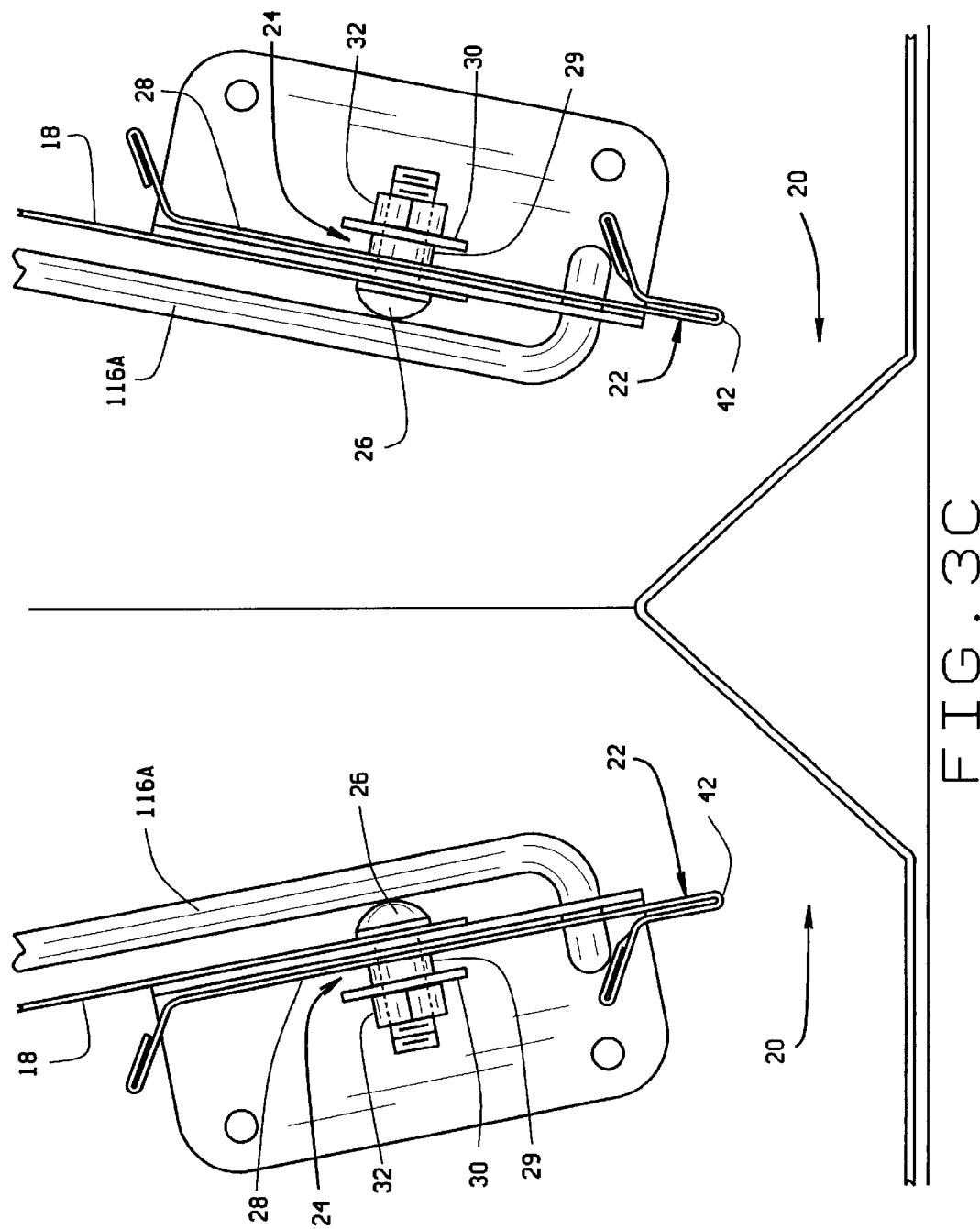

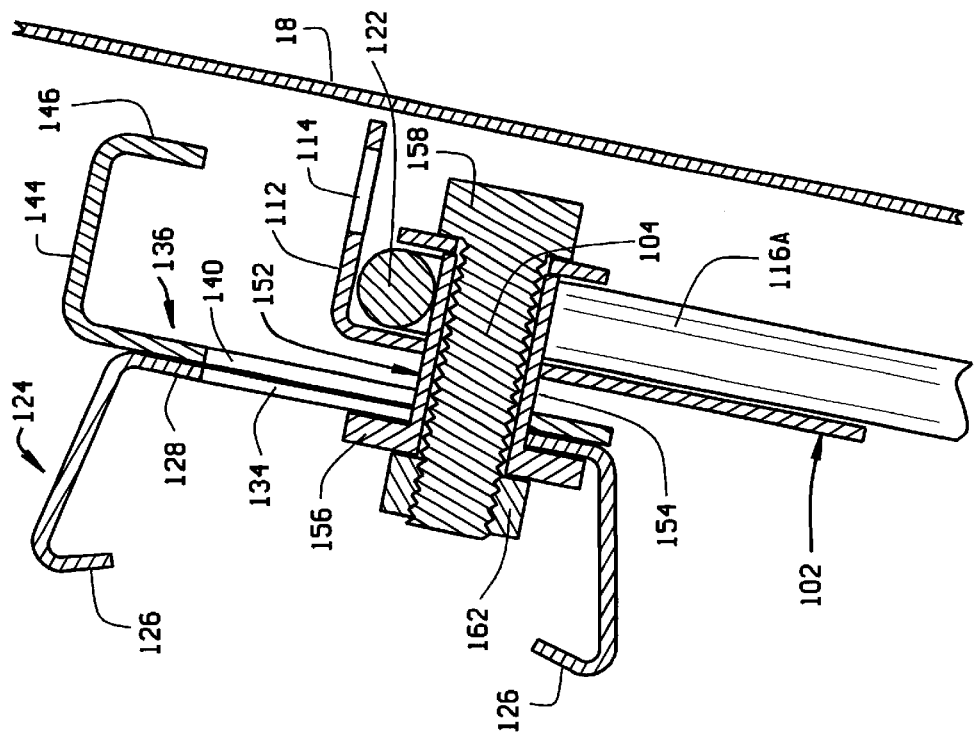
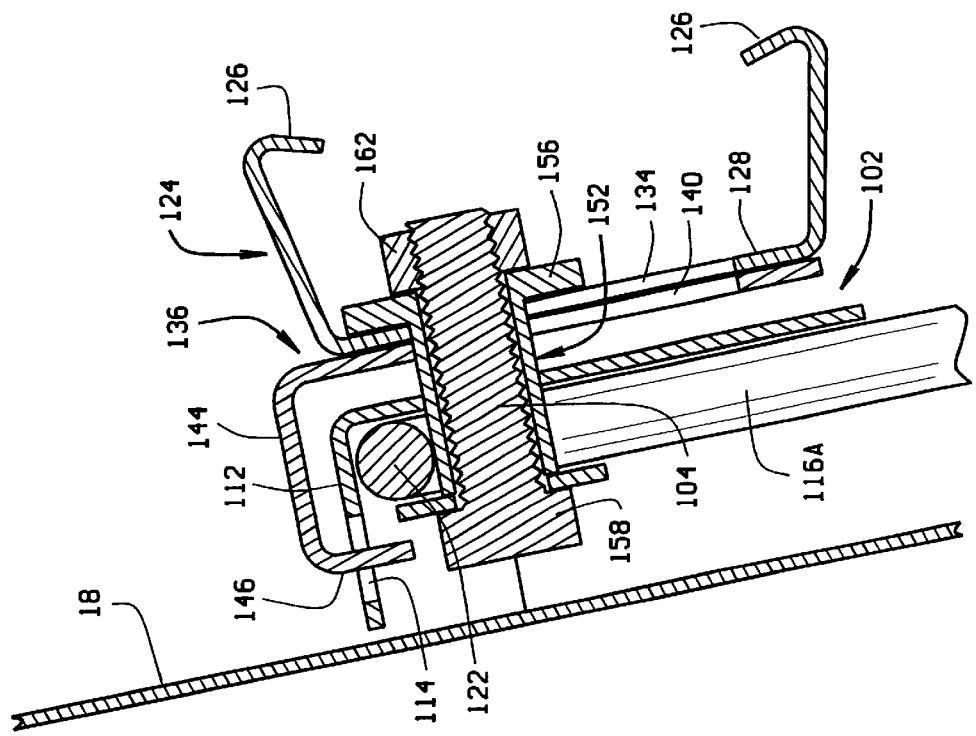

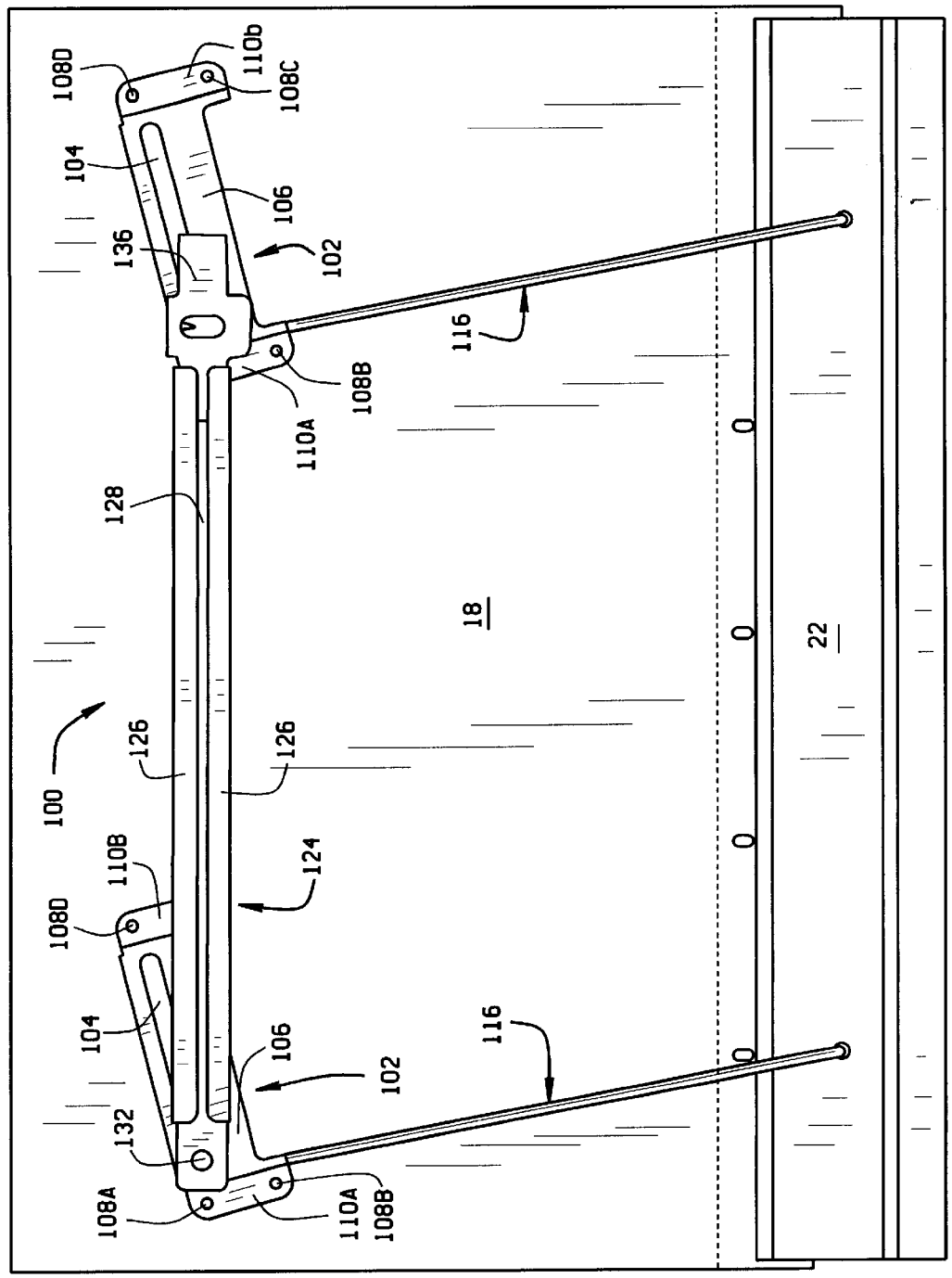

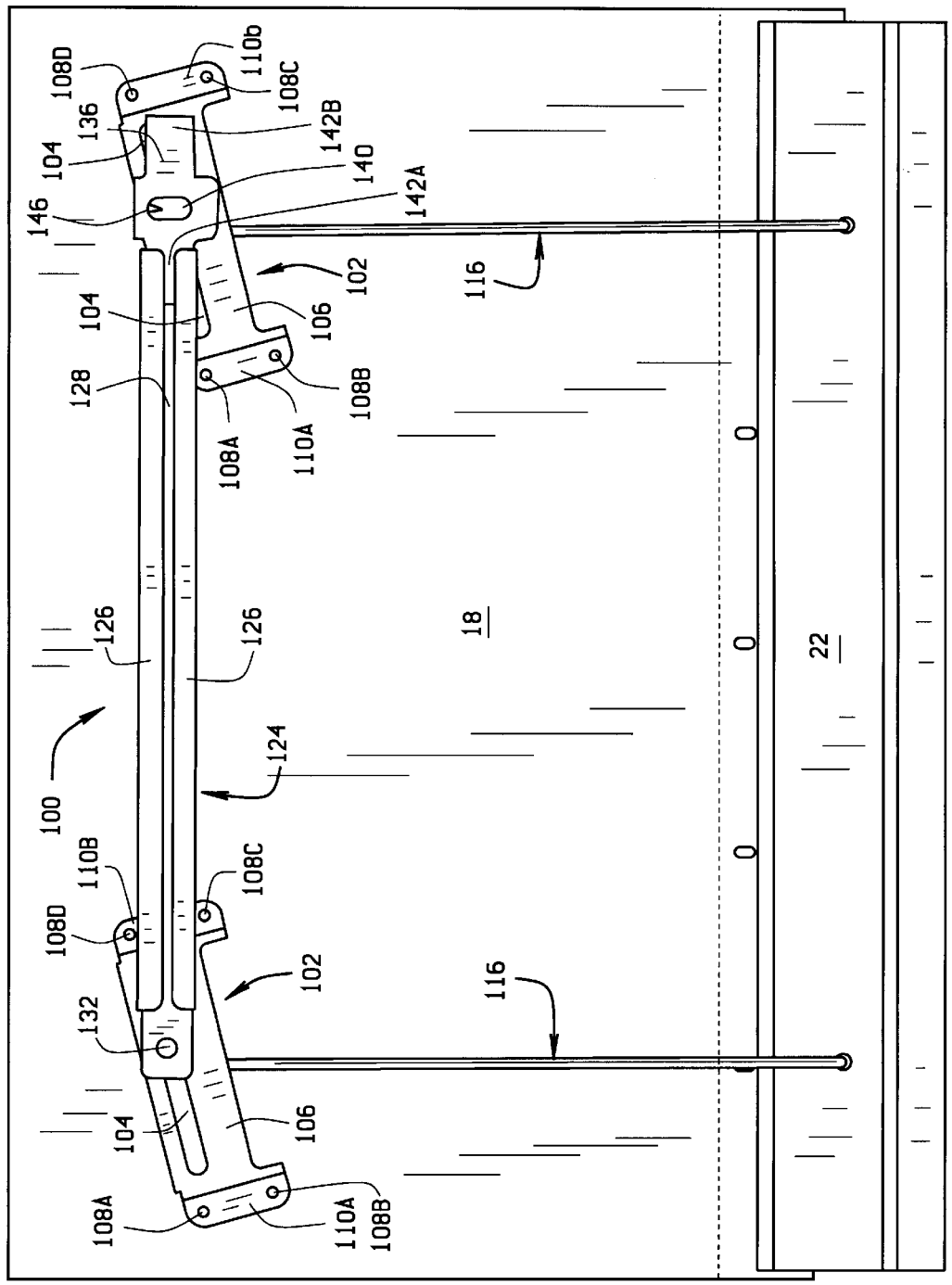

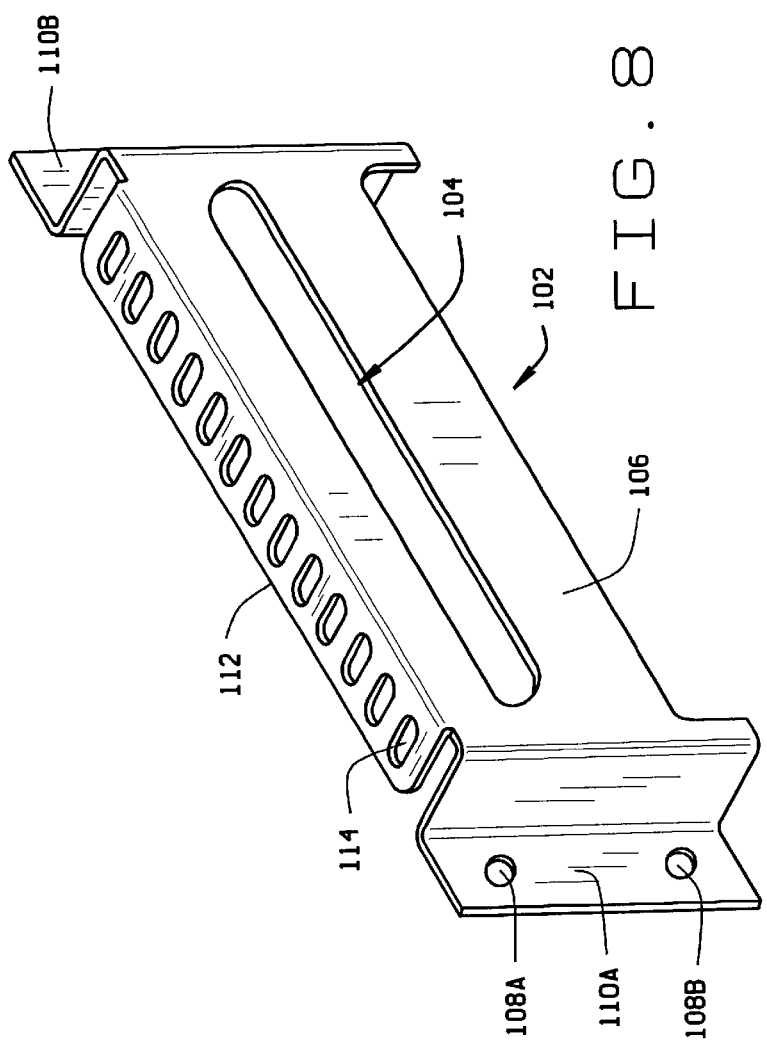
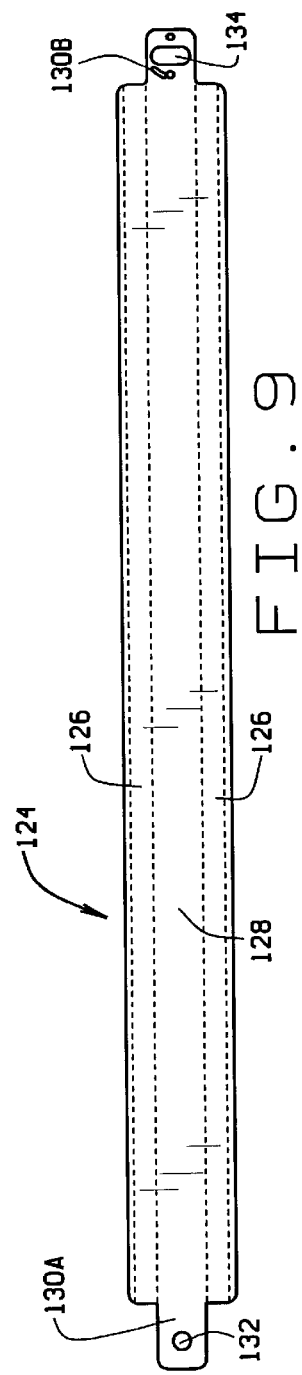

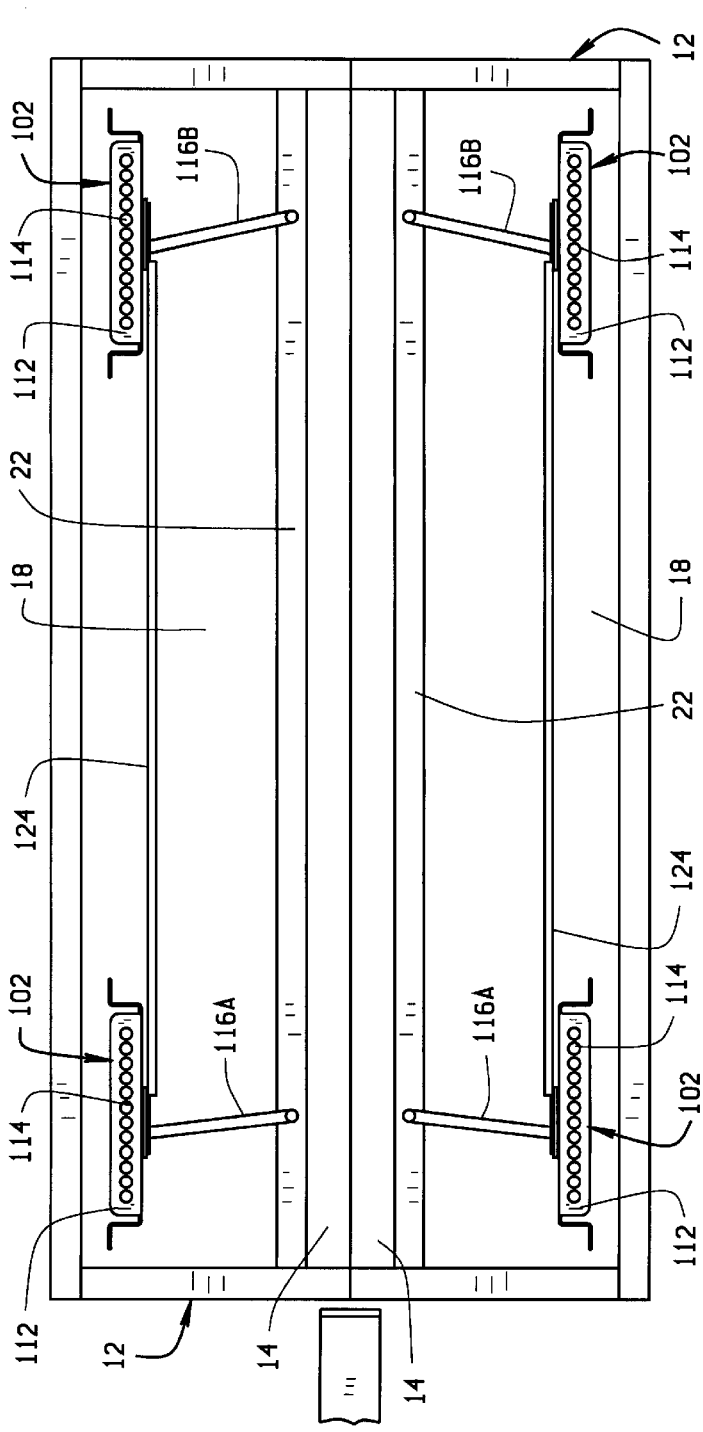
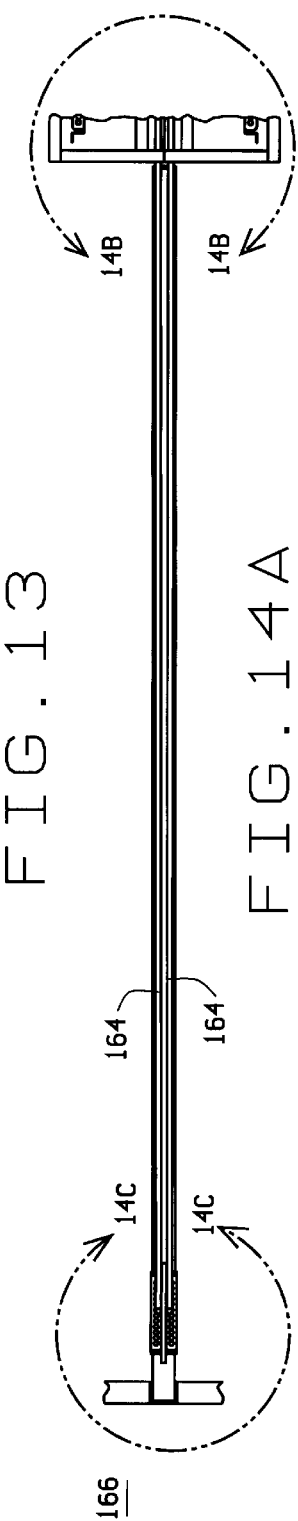
FIG. 13
FIG. 14A

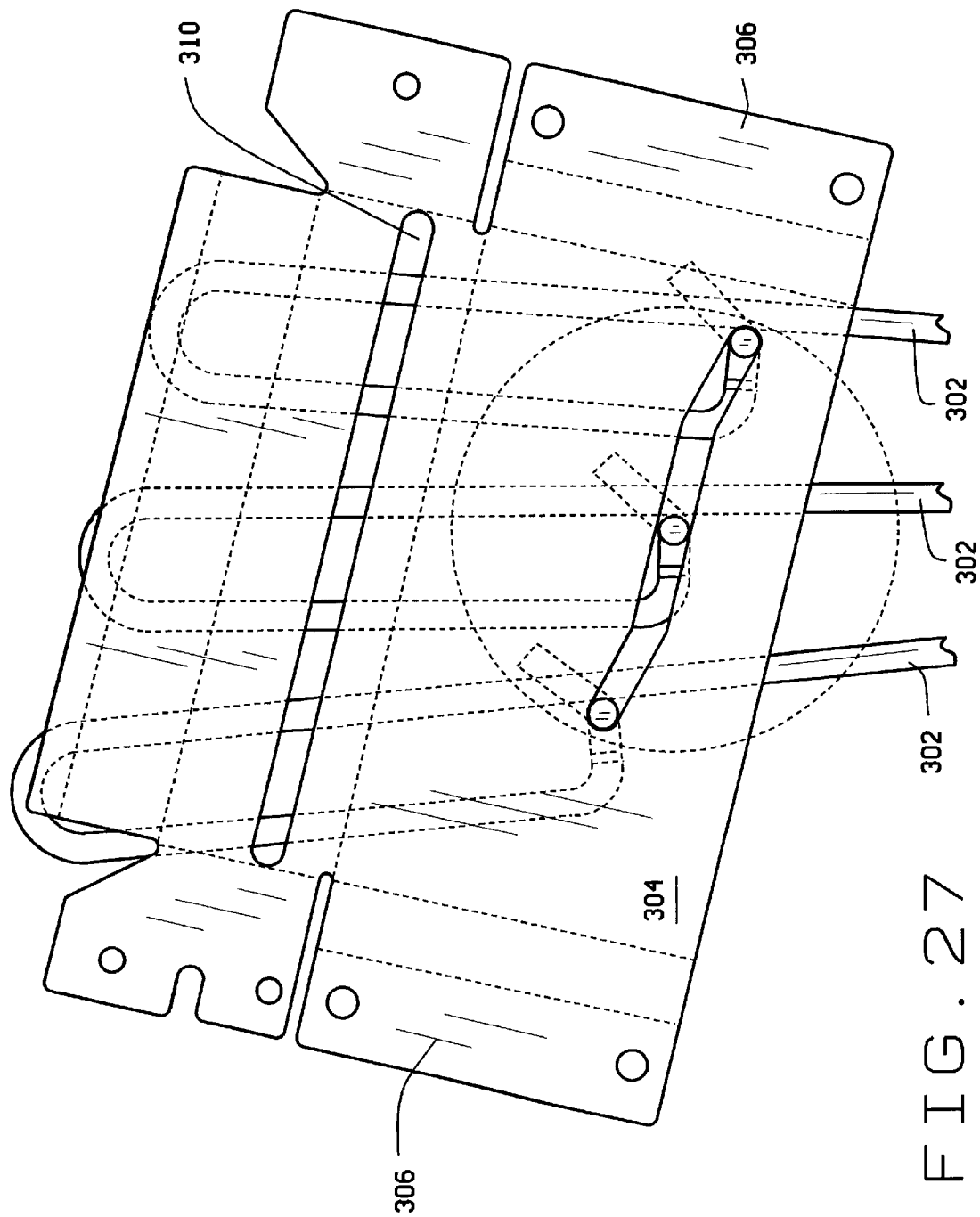

HOG FEEDER WITH ADJUSTABLE FEED CONTROL GATES

CROSS-REFERENCE TO RELATED APPLICATIONS

This application claims the benefit of U.S. Provisional Application No. 60/087,836, filed Jun. 3, 1998.

BACKGROUND OF THE INVENTION

The present invention relates generally to feeders for animals such as hogs, and more particularly to feeders of the type in which feed is dispensed from a bottom opening of an inclined hopper onto a shelf, the flow of feed controlled by means of vertically adjustable gates located at the bottom of the hopper which are actuated by means of a sliding cam member.

Traditional hog feeders comprise a feed trough with a feed hopper located above the trough. The feed hopper includes a pair of vertically aligned end walls and a pair of inclined and inwardly sloping longitudinal sides. A bottom discharge opening is located along each longitudinal side to allow feed contained within the hopper to gravity dispense into the trough. The size of each discharge opening is generally determined by a slideable gate positioned, adjacent the discharge opening and controlled by an adjustment mechanism. A typical adjustment mechanism, such as is shown in FIGS. 1–2 and U.S. Pat. No. 5,036,798 to Brent A. King, employs a pair of threaded rods, R1–R2 and R3–R4, each secured adjacent opposite ends of the slideable gate G, and extending vertically upward through a bushing B disposed in a horizontal cross-member H traversing the upper end of the hopper. The upper end of each rod is threaded to receive a threaded handle T, such that rotation of the threaded handled either raises or lowers the associated rod and the slideable gate G, relative to the horizontal cros-member H. Raising the gate increases the size of the discharge opening O through which the feed contained in the hopper may flow, and conversely, lowering the gate permits a reduction or stoppage of the feed flow.

Several drawbacks are apparent in the traditional hog feeder design. First, the adjustment mechanism for operating the slideable gates is disposed within the interior space of the hopper, and hence is continually surrounded by the feed stored within the hopper. This can lead to clogging or difficulty in operating the slideable gates, as the feed may interfere with the adjustment mechanisms. Second, the procedure by which a single slideable gate is adjusted requires the rotational actuation of two separate threaded handles, a time-consuming and tedious process. Without the operator carefully tracking the number of complete revolutions made by each handle, it is difficult to ensure the slideable gates are uniformly adjusted from one end to the other, and in comparison to the gate on the opposite side. Furthermore, the operator is often required to move around to the opposite side of the feeder to determine the actual adjustment of the second gate, often necessitating entering a second hog pen.

Accordingly, it is desirable to produce an adjustment mechanism for a hog feed having slideable gates which is not substantially disposed within the interior space of the feed hopper, and which employs a simple and efficient operating mechanism, allowing simultaneous adjustment of both ends of a gate, and operation of both gates from either side of the hopper.

BRIEF SUMMARY OF THE INVENTION

Among the several objects and advantages of the present invention are:

The provision of a new and improved hog feeder having a feed trough and a feed hopper, the feed hopper including slideable gates controlled by an cam driven adjustment mechanism;

The provision of the aforementioned hog feeder wherein the adjustment mechanism is configured to allow operator actuation of the slideable gates on opposite sides of the hopper from either side;

The provision of the aforementioned hog feeder wherein the adjustment mechanism includes a fully open setting, a fully closed setting, and a number of intermediate settings for each slideable gate;

The provision of the aforementioned hog feeder wherein the adjustment mechanism is configured to permit animal agitation of the slideable gates to facilitate the dispersal of feed;

The provision of the aforementioned hog feeder wherein the adjustment mechanism is isolated from any vertical motion of the slideable gates caused by the animal gate agitation;

The provision of the aforementioned hog feeder wherein a portion of said adjustment mechanism is disposed external to said hopper interior space;

The provision of the aforementioned hog feeder wherein said adjustment mechanism is configured to actuate a single gate through manual displacement of a single element;

The provision of the aforementioned hog feeder which eliminates the need for a plurality of threaded handles;

The provision of the aforementioned hog feeder which facilitates accurate adjustment of gates on opposite sides of the feeder from a single location;

The provision of the aforementioned hog feeder which is configured to permit adjustment of the gates from a location remote to the feeder;

The provision of the aforementioned hog feeder wherein said adjustment mechanism is constructed with reversible components to simply installation on opposite sides of the feed hopper; and The provision of the aforementioned hog feeder wherein said adjustment mechanism is simple to operate, easy to install, and cost efficient.

Briefly stated, the hog feeder with the adjustable gate mechanism of the present invention comprises a feed hopper for receiving and storing a supply of flowable, dry hog feed to be gravity dispensed from discharge openings in the lower longitudinal portions of the hopper for consumption by hogs over a length of time. The flow of hog feed from the discharge openings is controlled by a pair of slideable gates each having a cam actuated adjustment mechanism. The adjustment mechanism includes receiving notches on each side of the hopper corresponding to a fully open gate setting, a fully closed gate setting, and a plurality of intermediate gate settings. By positioning a selection lever within a desired notch, the corresponding slideable gate is shifted to the selected position by means of a sliding cam arrangement. The sliding cam arrangement transfers lateral motion of the selection lever into vertical motion of the slideable gate, allowing for opening and closing without the need for the rotation of threaded handles.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3B is a side view of an inner transverse wall of the hopper, illustrating an adjustment mechanism and slideable gate in the fully open position shown in FIG. 3A;

FIG. 3C is an enlarged side sectional view of section 3C—3C in FIG. 3A, illustrating the slideable gate and attachment elements in the fully open position;

FIG. 3D is an enlarged side sectional view of section 3D—3D in FIG. 3A, illustrating the adjustment mechanism cam elements in the fully open position, with the selector tab engaged;

FIG. 3E is an enlarged side sectional view of section 3E—3E in FIG. 3A, illustrating the adjustment mechanism cam elements with the selector tab disengaged, in preparation for adjustment of the sliding gate position;

FIG. 4B is a side view of an inner transverse wall of the hopper, similar to FIG. 3B, illustrating an adjustment mechanism and slideable gate in the fully closed position shown in FIG. 4A;

FIG. 5B is a side view of an inner transverse wall of the hopper, similar to FIG. 3B, illustrating an adjustment mechanism and slideable gate in the intermediate position shown in FIG. 5A;

FIG. 8 is a perspective view of a adjustment mechanism bracket including a cam track and a plurality of receiving notches;

FIG. 9 is a side view of the linkage bar element of the adjustment mechanism, including dimensions of one preferred embodiment of the present invention;

FIG. 13 is a top view of the hog feeder of the present invention illustrated in FIGS. 3A, 4A, and 5A;

FIG. 14A is a top view of an alternate embodiment of the present invention shown in FIG. 13, illustrating adjustment arm extensions for slideable adjustment of the hog feeder discharge openings from outside of a feeding pen;

FIG. 27 is an enlarged view of a portion of FIG. 25; and

Corresponding reference numerals indicate corresponding parts throughout the several figures of the drawings.

DESCRIPTION OF THE PREFERRED EMBODIMENT

Figure 1:
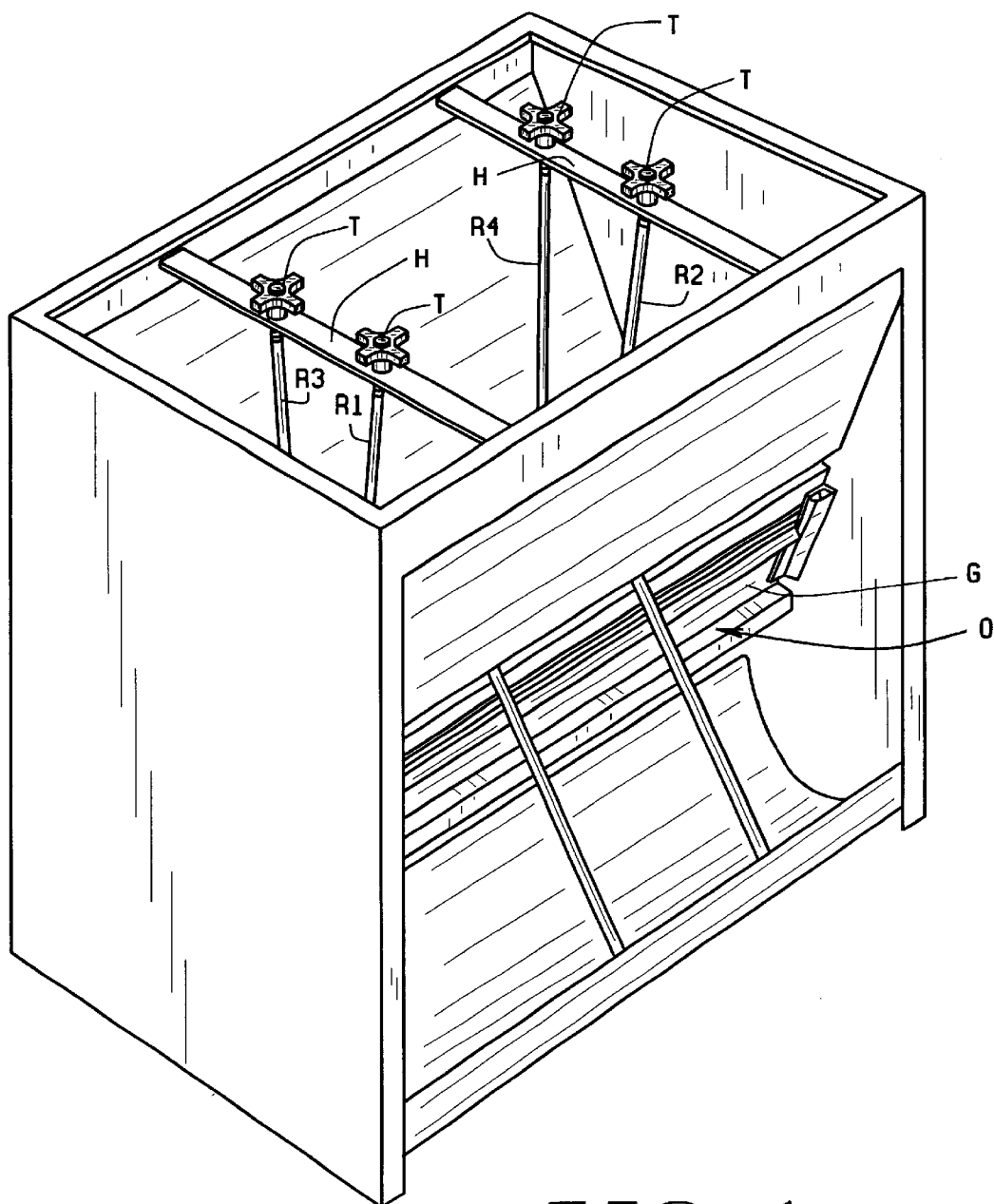
FIG. 1 is a perspective view of a prior art hog feeder with threaded adjustment handles.

The following detailed description illustrates the invention by way of example and not by way of limitation. The description will clearly enable one skilled in the art to make and use the invention, describes several embodiments, adaptations, variations, alternatives, and uses of the invention, including what we presently believe is the best mode of carrying out the invention.

Referring initially to FIGS. 3–5, indicated generally at 10 is a hog feeder comprising a pair of end walls 12, 12 between which extends a trough indicated generally at 14. Located above trough 14 and between end walls 12, 12 is a hopper indicated generally at 16 and having a pair of mutually converging inclined transverse sidewalls 18, 18 each extending downwardly and inwardly toward a hopper bottom discharge opening 20. Hopper 16 comprises a structure for storing dry, flowable, animal feed and for dispensing the feed through the hopper bottom discharge opening 20. In the preferred embodiment, feeder 10 is generally constructed of light-gauge sheet metal, cut, rolled, and formed into the desired components described herein.

Figure 3A:
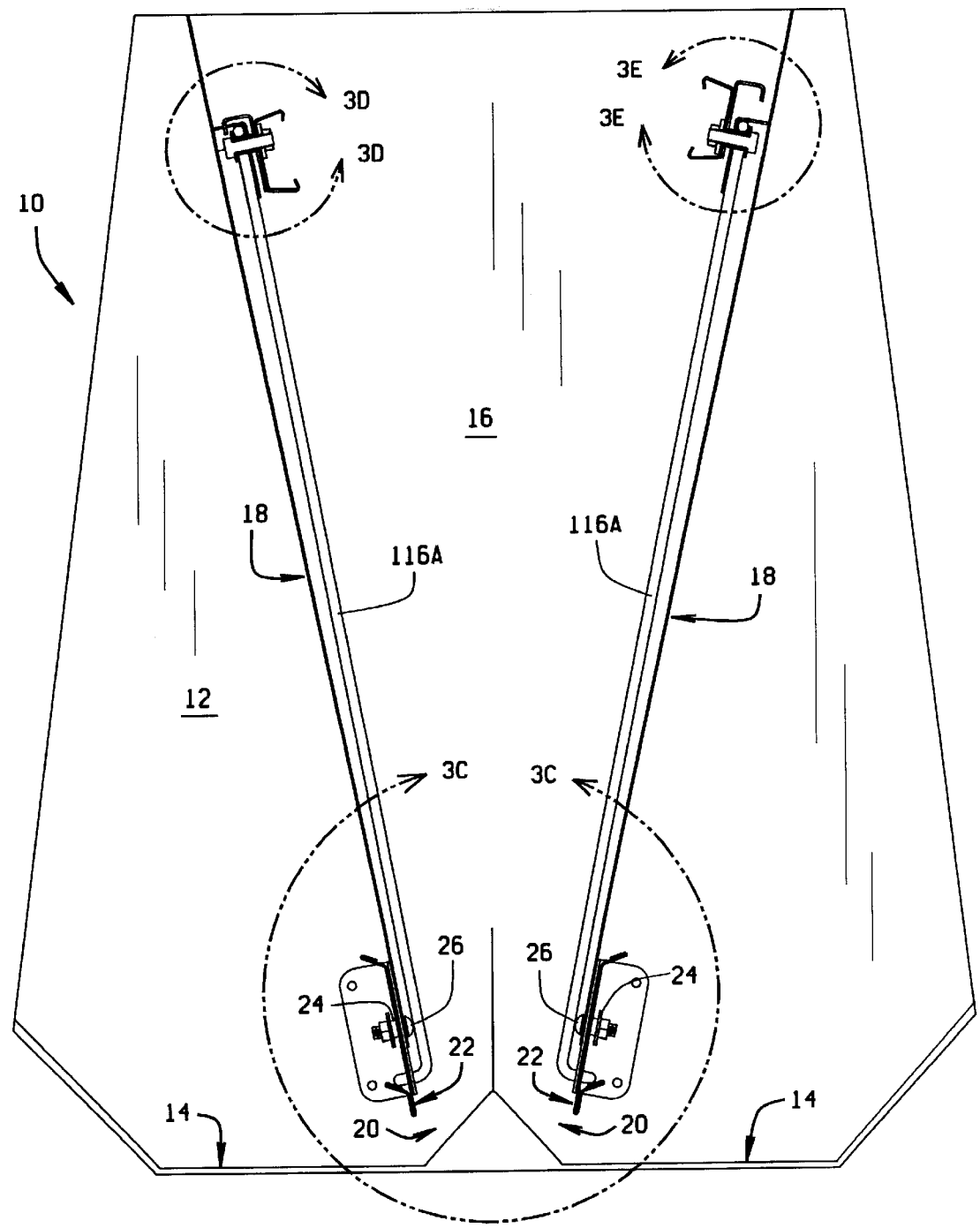
FIG. 3A is an side sectional view of a first embodiment of the present invention, illustrating the adjustment mechanisms in the fully open position, with the maximum displacement of the slideable gates.
Figure 4A:
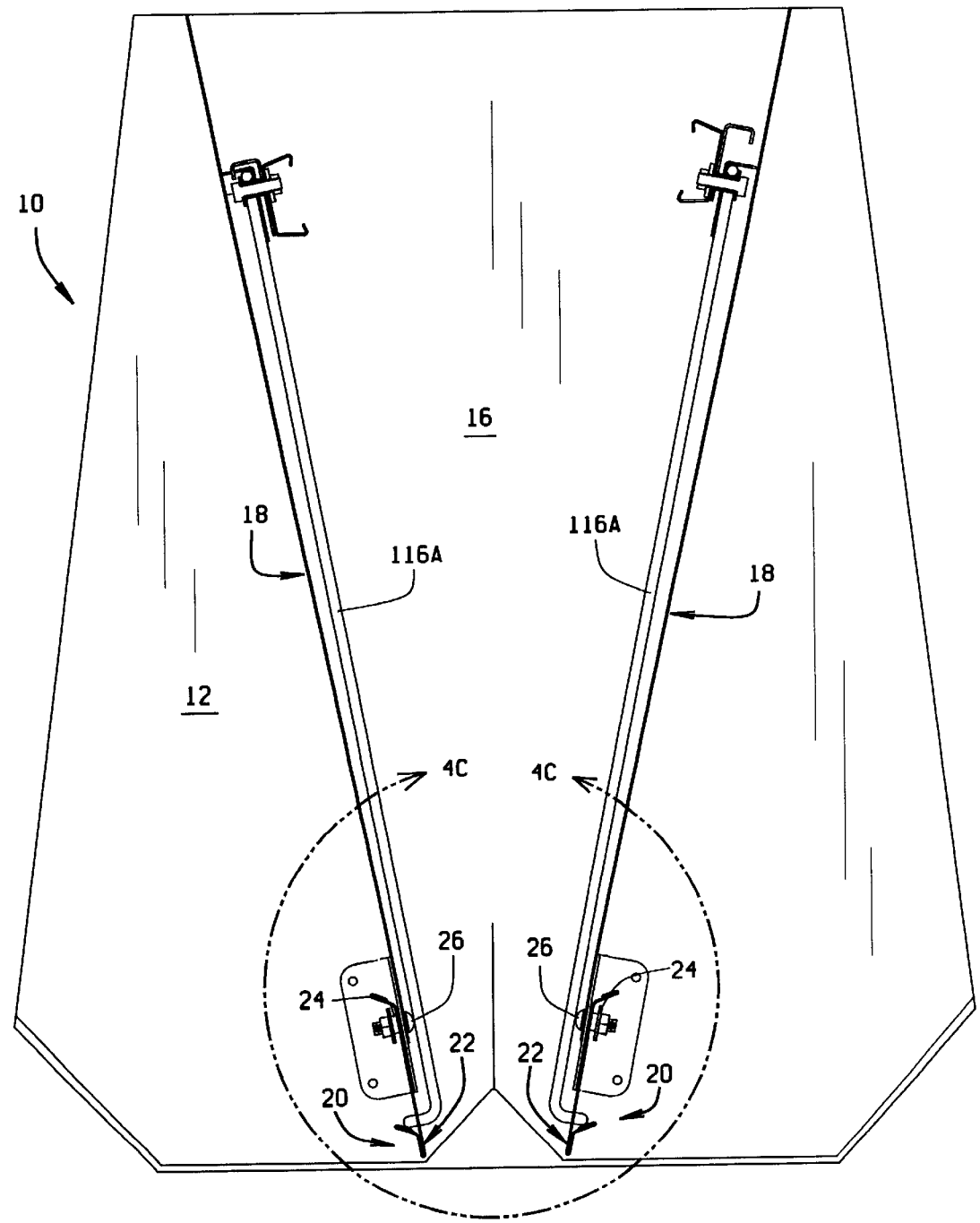
FIG. 4A is an side sectional view of a first embodiment of the present invention, similar to FIG. 3A, illustrating the adjustment mechanisms and slideable gates in the fully closed position.
Figure 4C:
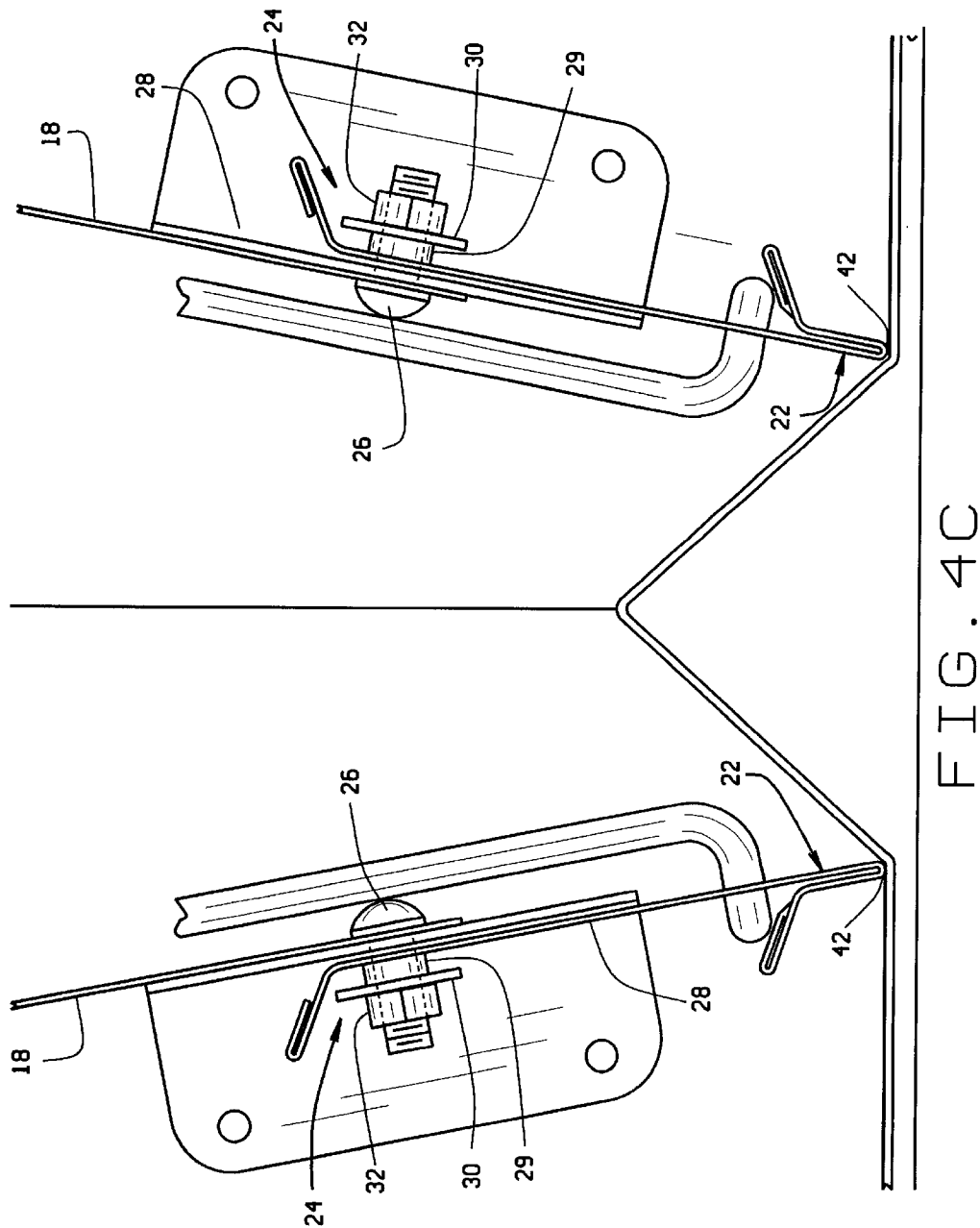
FIG. 4C is an enlarged side sectional view of section 4C—4C in FIG. 4A, illustrating the slideable gate and attachment elements in the fully closed position.
Figure 5A:
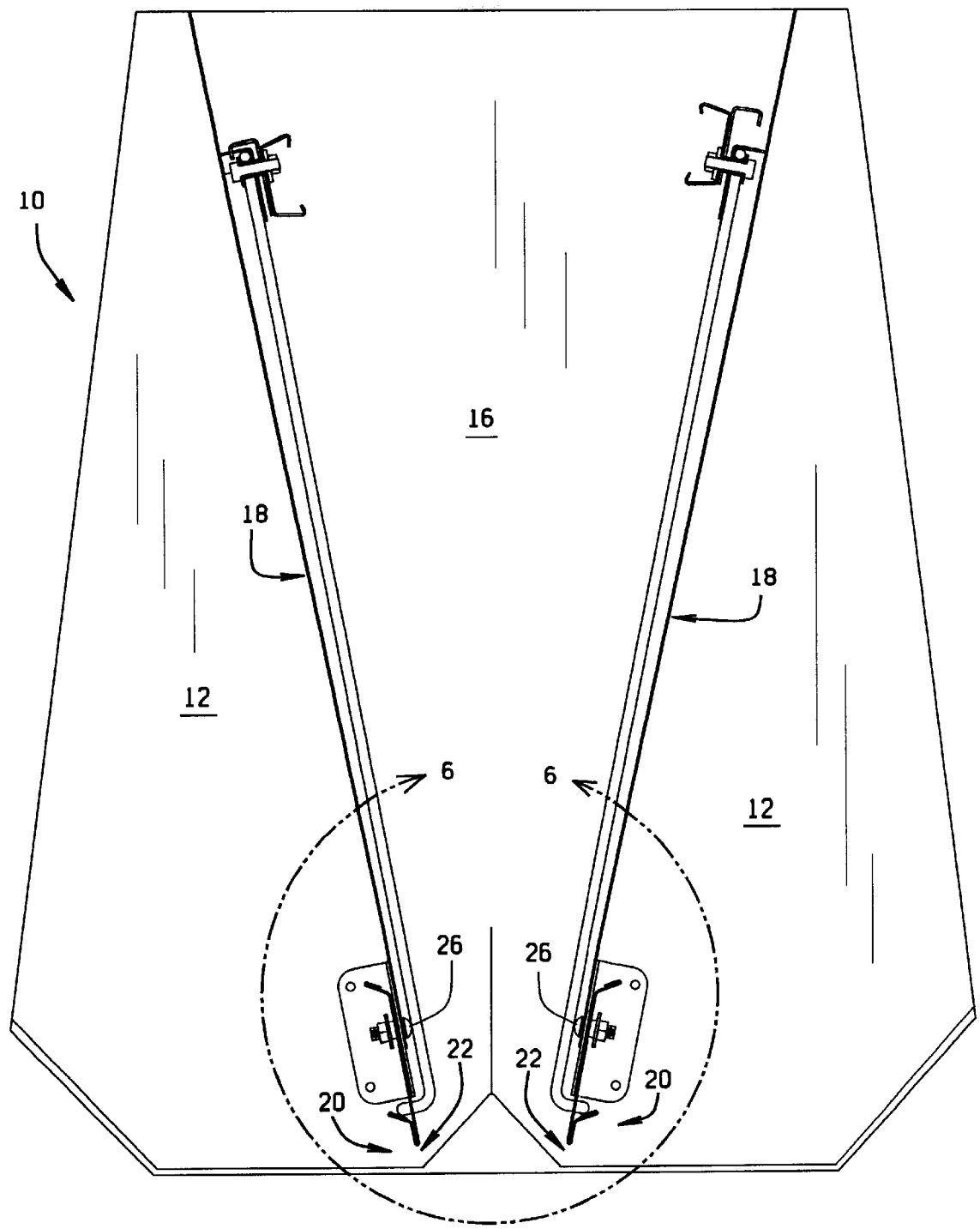
FIG. 5A is an side sectional view of a first embodiment of the present invention, similar to FIG. 3A, illustrating the adjustment mechanisms and slideable gates in an intermediate position.

Located at the bottom of each inclined hopper sidewall 18 is a slideable gate 22. As best seen in FIGS. 3A, 4A, and 5A, each gate 22 is slideably secured adjacent the outer surface of an inclined sidewall 18 by a pair of bushings 24, 24 each mounted on a respective threaded bolt 26, 26 passing through the inclined sidewall 18, adjacent an end wall 12, and through vertically aligned slots 28,28 in slideable gate 22. Each bushing 24 comprises a tubular body 29 having an outer diameter sized to fit within slot 28, and an enlarged base flange 30. As is best seen in FIGS. 3C and 4C, the vertically aligned slots 28, 28 of slideable gate 22 are fitted over bolts 26, 26, upon which bushings 24, 24 are then placed. The tubular body 29 of each bushing 24 passes through the slot 28, and seats against the outer surface of the inclined sidewall 18. A retaining nut 32 is then threaded onto bolt 26, retaining the slideable gate in vertically movable relation to the bushings 24, 24 and bolts 26,26.

Figure 6:
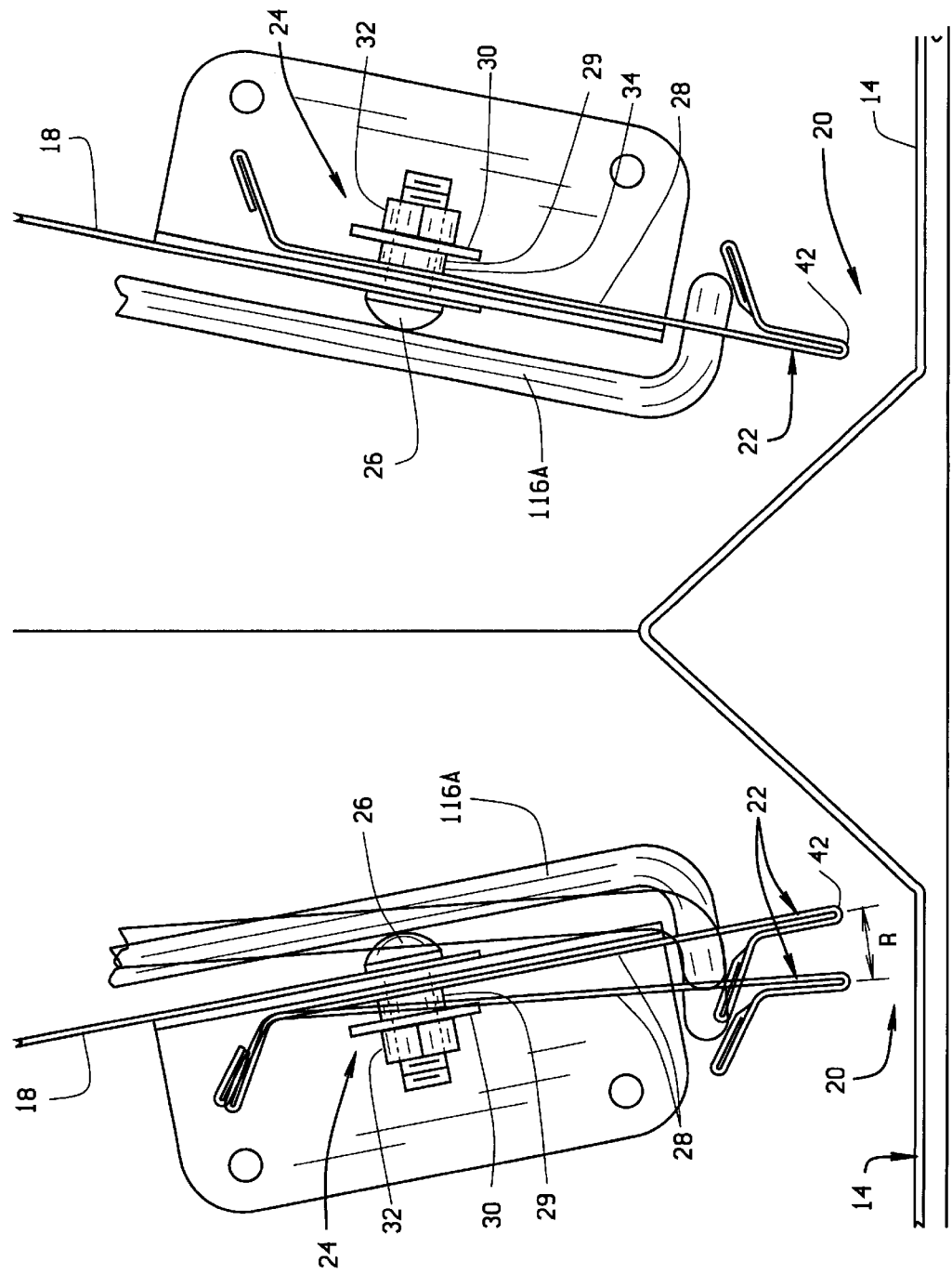
FIG. 6 is an enlarged side section view of section 6—6 in FIG. 5A, illustrating the slideable gate and attachment elements in an intermediate position, and further illustrating alternative embodiments of the slideable gates, wherein one gate is configured to allow for lateral displacement, and the opposite gate is constrained against lateral displacement.

As seen in FIG. 6, the length of tubular body 29 on bushing 24 is sufficient to permit some degree of rotational motion R of the slideable gate 22 about the bushing. This rotational motion allows a hog or other animal feeding at the trough to nudge the slideable gate 22, facilitating the flow of feed into the trough 14 from the hopper 16. The degree of rotational movement permitted about the bushing is controlled by the placement of washers 34 over tubular body 29, between the slideable gate 22 and the enlarged base flange 30. As seen in FIG. 6, the inclusion of two washers 34, 34 is sufficient to prevent any rotational movement of the slideable gate, constraining all gate motion to inclined opening and closing, allowing greater control over the amount of feed flowing into trough 14.

In an alternate embodiment, the slideable gate is received between the outer surface of an inclined sidewall 18 and a pair of guide members 36, 36 each mounted on a respective feeder end wall 12 adjacent the inclined sidewall 18. Each guide member 36 is inclined at the same angle as the inclined sidewall 18, and is spaced outwardly from the sidewall. Each inclined sidewall 18 and its associated pair of inclined guide members 34, 34, constitute structure mounting a slideable gate 22 for sliding movement along the sidewall 18 in the direction of inclination. Each guide member 36 has an L-shaped cross section comprising one flange 38 attached to an end wall 12, as by welding, and another flange 40 for engaging and guiding the slideable gate 22. Those skilled in the art will recognize that additional means for retaining the slideable gate 22 in a vertically sliding relation to the inclined sidewall 18 may be employed within the scope of this invention.

Figure 7:
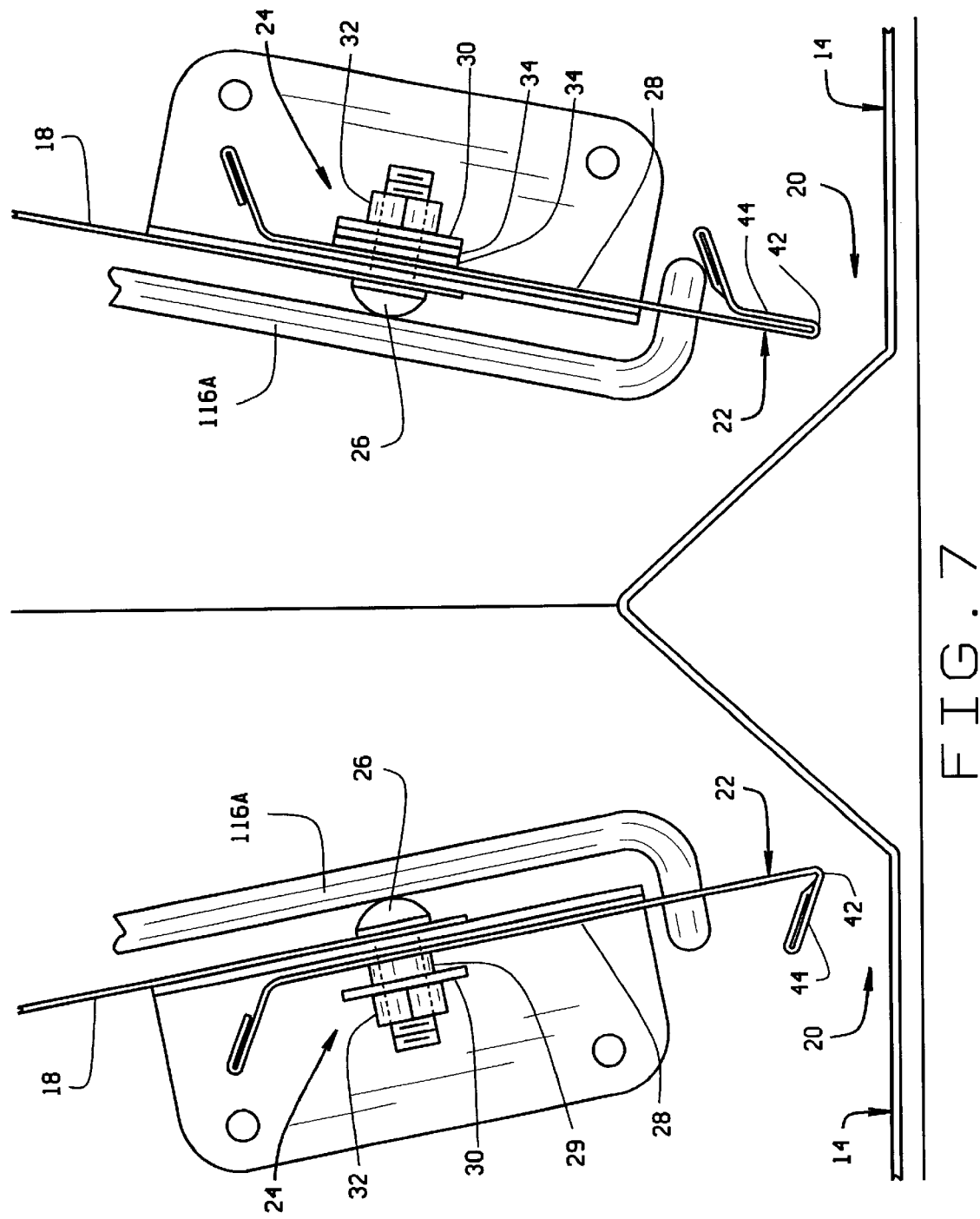
FIG. 7 is an enlarged side section view similar to FIG. 6, illustrating alternate sectional configurations for one slideable gate, facilitating the passage of the gate through dispensed feed and any agitation by a feeding animal.

Each slideable gate 22 has a lower edge 42, with the distance between the gate's lower edge 42 and the trough 14 defining the size of the hopper's bottom discharge opening 20. The lower edge 42 of each slideable gate is formed by rolling and bending a lip 44 into the material comprising slideable gate 22. As seen in FIG. 7, different configurations for edge 42 are within the scope of this invention, and may be constructed by well known metal forming techniques. The embodiment of edge 42, shown on the right-hand side of FIG. 7, is configured to permit the 5 slideable gate 22 to easily cut-through any feed which has been dispensed through the discharge opening 20, as the gate is lowered. Similarly, the embodiment shown on the left-hand side of FIG. 7 is adapted such that lip 44 will push any dispensed feed out, away from the discharge opening 20 as the gate is lowered. Additional configurations for the slideable gates are readily apparent to one skilled in the art, and include a box-configuration, wherein the gate is formed from a single sheet of a light gauge metal, folded and formed into an elongated and enclosed channel or box. A channel or box construction is highly resistant to torsional bending along the length of the gate, and may be further reinforced by filling the internal spacing of the channel with a porous foam or similar material.

Turning now to FIGS. 3B, 3D, 4B and 4D, a first preferred embodiment of the adjustment mechanism indicated generally at 100 for the slideable gate 22 is shown. The adjustment mechanism 100 comprises a pair of adjustment brackets 102, 102 carrying cam tracks 104, 104, and mounted apart at an incline to the inner surface of sidewall 18, adjacent the upper end of hopper 16. FIG. 8 illustrates an individual adjustment bracket 102, preferably formed by cutting and bending a single sheet of metal. The bracket 102A includes a cam track 104 on the front face 106, and four mounting holes 108A–108D drilled through side flanges 110A and 110B, through which bolts (not shown) are passed to secure the bracket to sidewall 18. Side flanges 110A and 110B additionally serve to space the front face 106 of the bracket away from the sidewall 18. The bracket 102 further includes an upper surface 112, through which a number of equally spaced selector openings 114 are formed. The number, size, and spacing of the selector openings 114 correspond to various degrees of opening for slideable gate 22, and one skilled in the art will recognize that numerous sizes and spacing may be employed to provide desired gate settings.

Figure 10A:
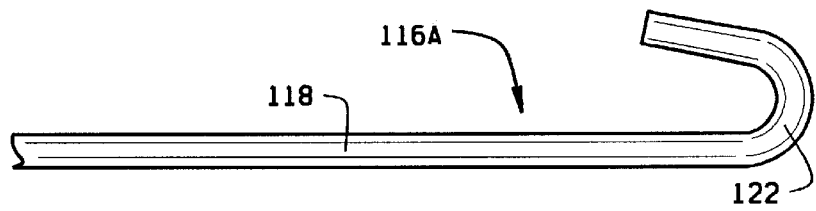
FIG. 10A is a side view of a connecting rod element of the adjustment mechanism including dimensions of one preferred embodiment of the present invention.
Figure 10B:
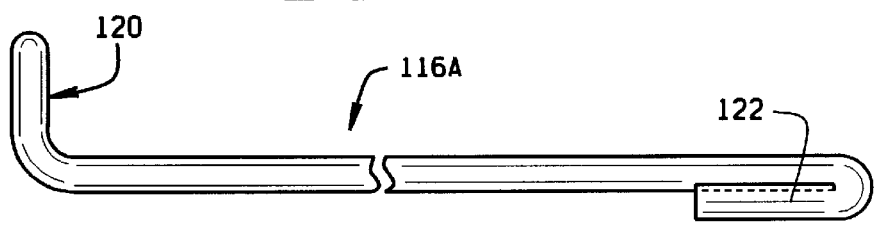
FIG. 10B is a front view of the connecting rod element shown in FIG. 10A, including dimensions of one preferred embodiment of the present invention.
Figure 10C:
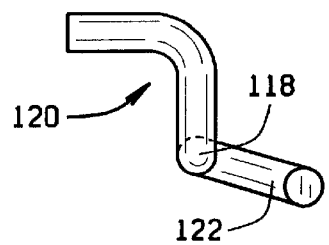
FIG. 10C is a bottom view of the connecting rod element shown in FIGS. 10A and 10B, including dimensions of one preferred embodiment of the present invention.

Adjustment mechanism 100 further comprises a pair of connecting rods 116A and 116B connecting the slideable gate 22 with the mechanism 100. Rods 116A and 116B are identically constructed, and accordingly only one rod is described below. FIGS. 10A–10C illustrate the several views of rod 116A, along with dimension for the preferred embodiment. The lower end of rod 116A is bent perpendicular relative to the shaft portion 118, forming a gate hook 120, while the upper end is radiused to provide an elongated loop 122.

As seen in FIGS. 3B and 4B, an adjustment arm 124 links adjustment brackets 102, 102. The adjustment arm, shown in FIG. 9, comprises an elongated strip of metal, with transverse edges 126, 126 folded inward and against the front face 128 of the arm, providing reinforcement against bending. A tab 130A, 130B extends from each end of arm 124 to provide a mounting point for a cam-retaining bolt. Tab 130A includes a circular opening 132, whereas tab 130B includes an elongated opening 134 to facilitate attachment of a selector guide 136.

Figure 11:
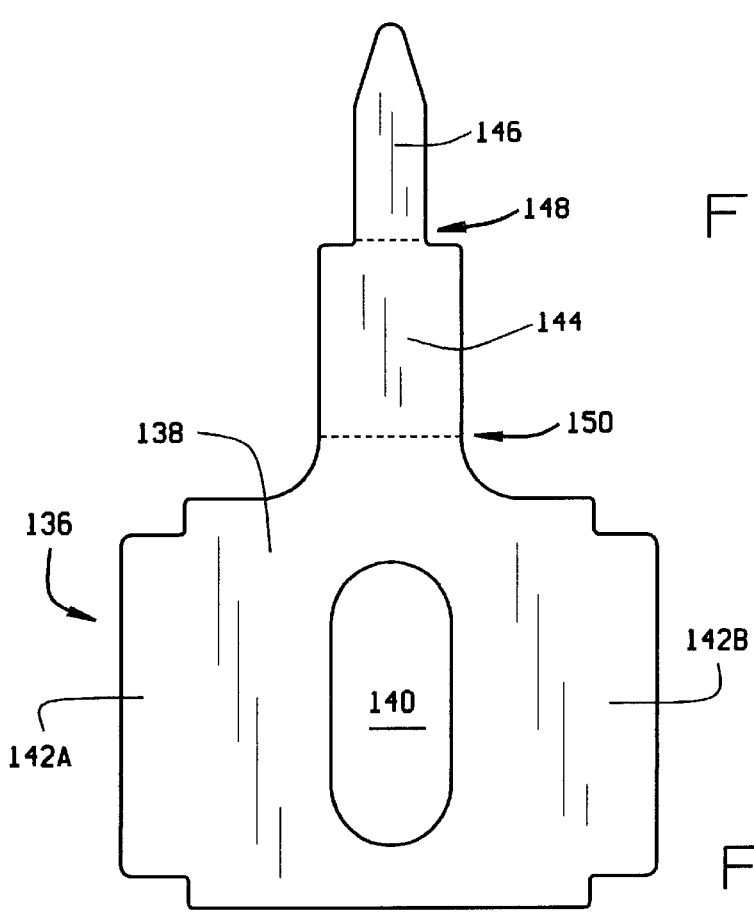
FIG. 11 is a top view of the locking element of the adjustment mechanism, including dimensions of one preferred embodiment of the present invention.

Selector guide 136, shown in FIG. 11, is formed by cutting and bending a flat sheet of rigid material, preferably sheet metal. The selector guide consists of a generally square body portion 138, through which passes an elongated slot 140. Tabs 142A and 142B extend from left and rights sides of the body portion 138, and are sized to slide within the folded transverse edges 126, 126 of the adjustment arm 124 when the selector guide is secured thereto. One skilled in the art will recognize that the length of tabs 142A and 142B may be extended to allow for a greater portion of the selector guide to seat within the folded transverse edges 126, 126, further reinforcing the selector guide against undesired movement. A neck 144, of narrower width than the body portion, extends from the upper edge of body portion 138, and terminates in an elongated selector tab 146. In forming the selector guide 136, the selector tab 146 is bent perpendicular to the neck 144 along line 148. Neck 144 is then also bent perpendicular to the body portion 138, along line 150 and in the same direction as selector tab 146, such that the selector tab, neck, and body portion form an "n" shape, with the elongated selector tab 146 directed downward, parallel to the body portion 138.

As best shown in FIGS. 3B, 4B, and 5B, selector guide 136 is secured to the adjustment arm 124 by sliding either tab 142A or 142B within the folded transverse edges 126, 126, such that elongated slot 140 aligns with elongated opening 134 in the adjustment arm, and the selector tab 146 is directed downward. Those skilled in the art will recognize that the configuration of the adjustment arm and the selector guide allow for a reversible configuration, i.e. the selector guide may be properly positioned on the left side of the adjustment arm, as opposed to the right side, by simply reversing the adjustment arm and inserting the opposite tab 142B between the folded transverse edges 126, 126. Such design eliminates the need to maintain a separate inventory of left- and right-handed parts, and facilitates construction of opposite sides of the hog feeder 10.

Turning to FIGS. 3D and 3E, enlarged side section views of portions of the assembled, adjustment mechanism are shown. In FIG. 3D, the connecting rod 116A is shown secured to the adjustment arm 124, and an elongated cam 152 carried by adjustment bracket 102. Elongated cam 152 comprises an elongated tubular body 154 of a plastic or similar low-friction and wear resistant material, and an enlarged diameter base flange 156. A threaded bolt 158, carrying a washer 160, elongated cam 152, and a retaining nut 162 is passed through the elongated loop 122 of rod 116A and is seated within the cam track 104 of bracket 102. The cam 152 and bolt 158 further pass through the elongated opening 134 in adjustment arm 124, and elongated slot 140 in the selector guide. In the illustrated figures, the selector guide 136 is shown secured to the backside of the adjustment arm 124, however, in an alternate embodiment, the selector guide may be secured to the front face 128 of the adjustment arm, such that the tabs 142A or 142B are seated within the space defined by the folded transverse edges 126, 126. Finally, retaining nut 162 is threaded to bolt 158, adjacent the base flange 156, retaining the assembly together. The opposite end of the adjustment arm 124, and second connecting rod 116B are similarly secured by means of an identical elongated cam 152 to the second retaining bracket comprising the adjustment mechanism. In the preferred embodiment, only one selector guide 136 is employed in the adjustment mechanism on each side of the hog feeder, however, one skilled in the art will recognize that a second selector guide may be included at the opposite end of the adjustment arm from the first selector guide.

Figure 12:
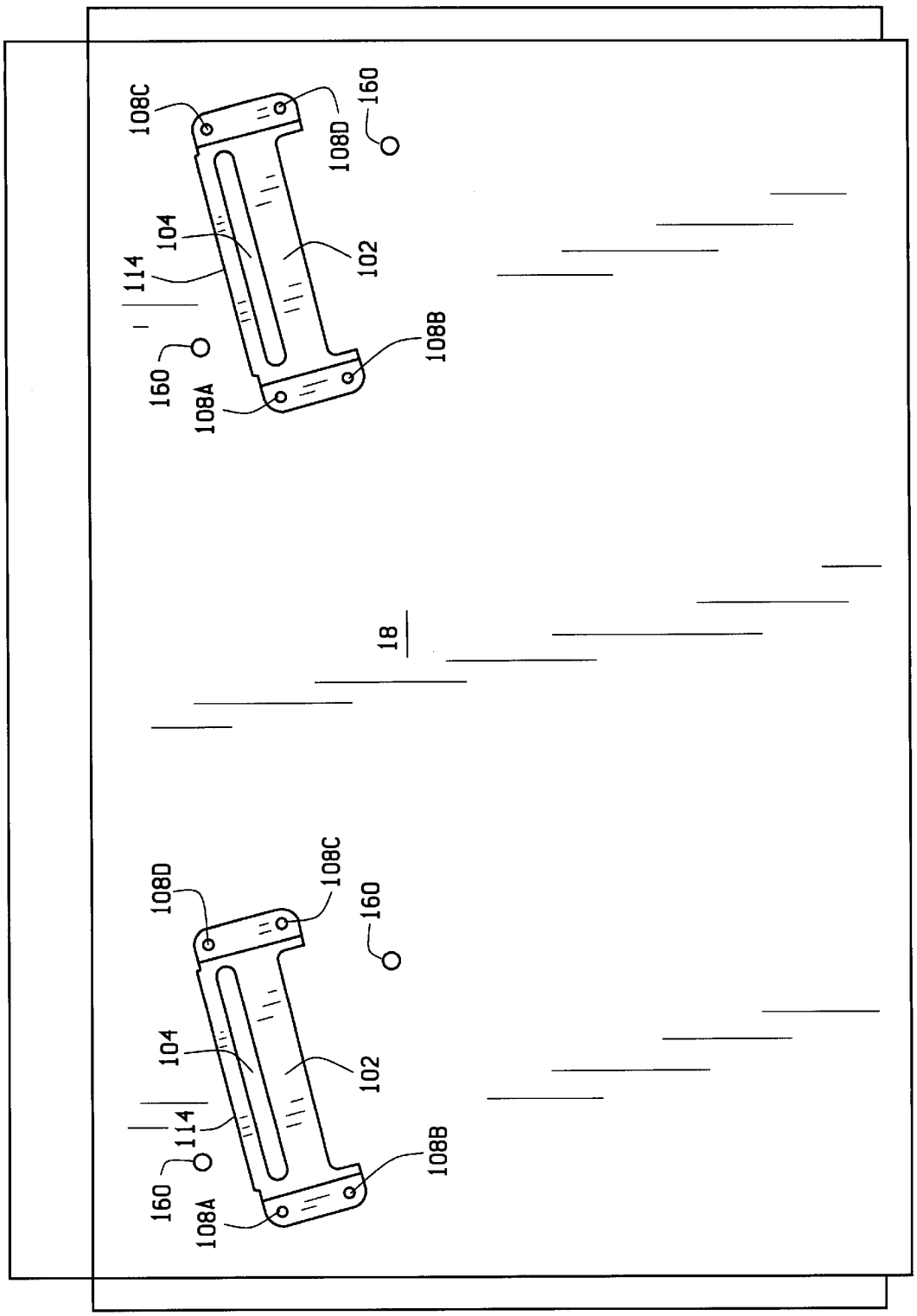
FIG. 12 is a side view of an inner transverse wall of the hopper, illustrating the reversible placement of the adjustment mechanism brackets.

As shown in FIG. 3D, in the normal or "locked" position, selector tab 146 seats within a selector opening 114 formed in upper surface 112 of the bracket 102. The selector tab extends sufficiently through selector opening 114 to prevent any lateral movement of the adjustment arm 124. To adjust the size of the discharge opening 20, the adjustment arm 124 is moved vertically, with the elongated cam sliding downward in the elongated opening 134 and elongated slot 140, withdrawing the selector tab 146 from the selector opening, FIG. 3E, and allowing lateral motion of the arm. Lateral motion of the arm causes the elongated cam 152 to follow the cam track 104. As best seen in FIG. 12, brackets 102 comprising the mounting points for the adjustment mechanism are secured to the transverse sidewall 18 of the hopper 16 at an incline by means of bolts (not shown) passing through openings 160. Additional openings 160 allow for the brackets 102 to be secured at a variety of incline angles, facilitating the reversal of the adjustment mechanism, as is required for constructing the opposite side of the hopper. The inclined nature of the bracket 102, and correspondingly, of the cam track 104 translates the lateral motion of the adjustment arm into a corresponding vertical motion in the connecting rods 116A and 116B, raising or lowering the slideable gate 22. Once the desired discharge opening size is achieved, the adjustment arm is then seated, allowing the selector tab 146 to pass through a selector opening 114.

Figure 2:
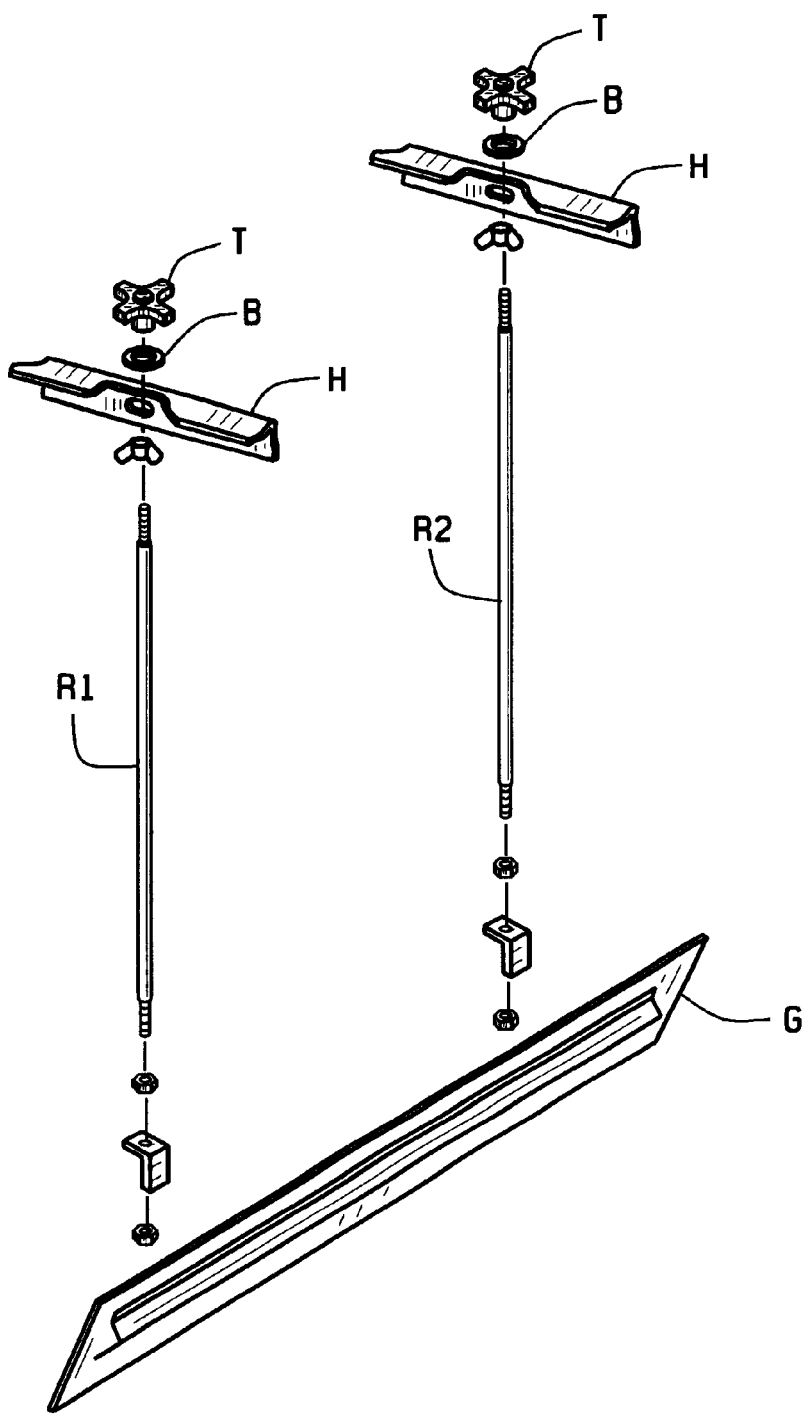
FIG. 2 is an exploded view of the adjustment mechanism and slideable gate for the prior art hog feeder shown in FIG. 1.
Figure 3F:
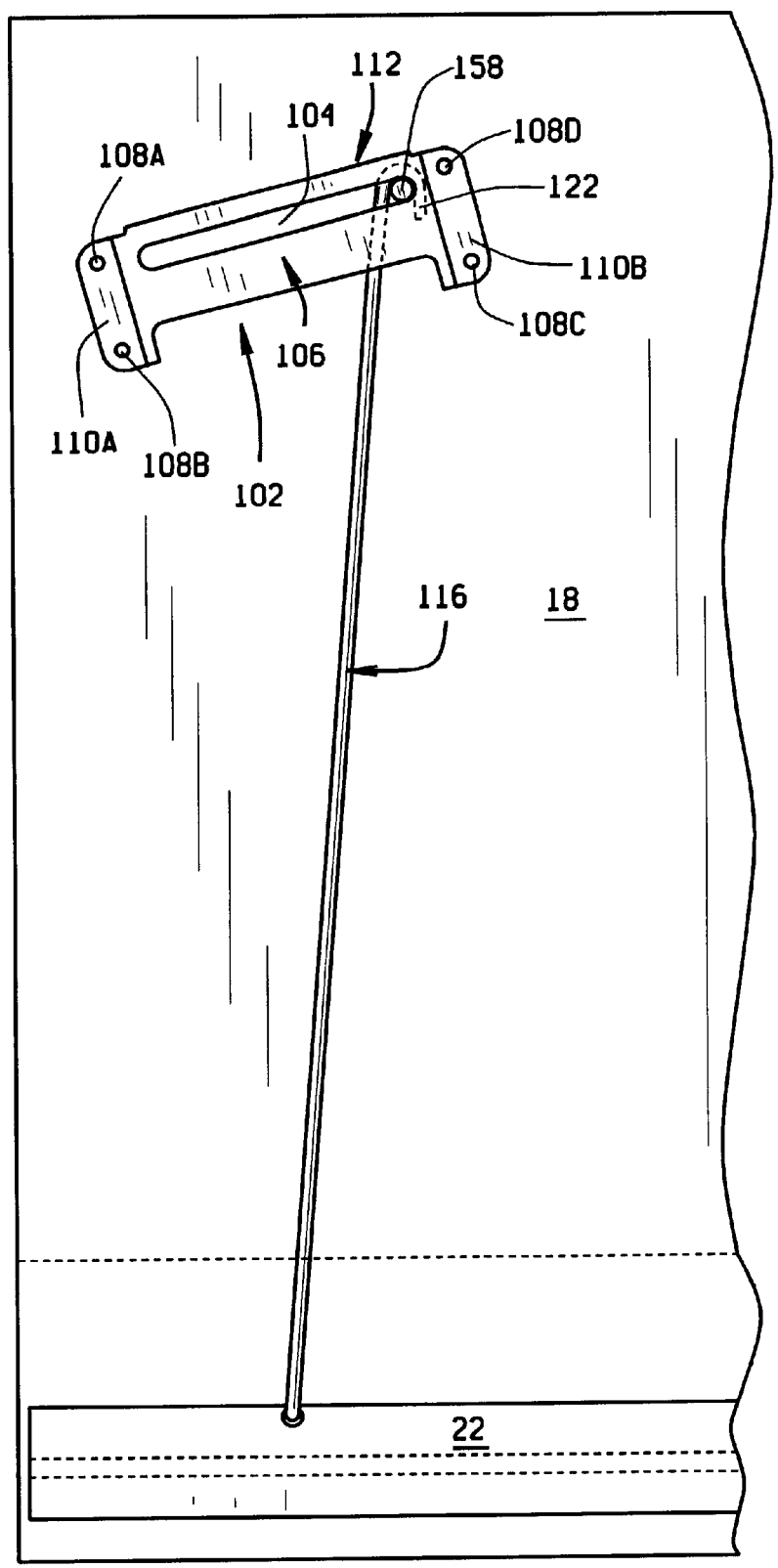
FIG. 3F is partial side view of an inner transverse wall of the hopper, illustrating the vertical movement interaction of a connecting rod and bracket in the adjustment mechanism.

As is readily apparent from FIG. 3F, any vertical movement of the connecting rod 116A will not be transferred to the selector guide 136, thereby preventing accidental dislocation of the selector tab 146 from the selector opening 114. Rather, vertical movement of the connection rod 116A will always be constrained by the interaction of the upper portion of the elongated loop 122 with the underside of the upper surface 112 of the bracket 102. Hence, when a hog or other animal feeding at trough 14 presses upward against slideable gate 22, the gate will be restrained against any undesired vertical movement by the connecting rod 116A and bracket 102. In contrast, prior art adjustment mechanisms, such as the threaded rods and handles shown in FIGS. 1 and 2, are continually agitated by any vertical motion of the slideable gate, resulting in excessive wear and possible premature failure of the components.

Figure 14B:
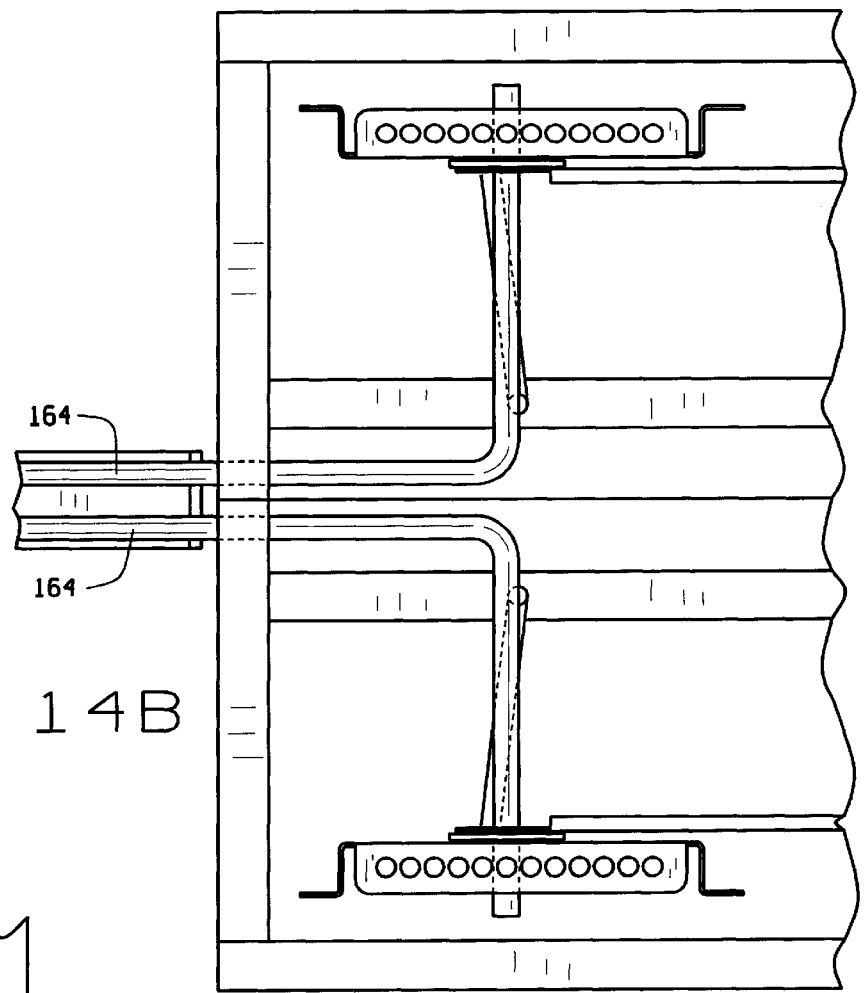
FIG. 14B is an enlarged top view of section 14B–14B in FIG. 14A, illustrating the connection between the adjustment arm extensions and the adjustment mechanism.
Figure 14C:
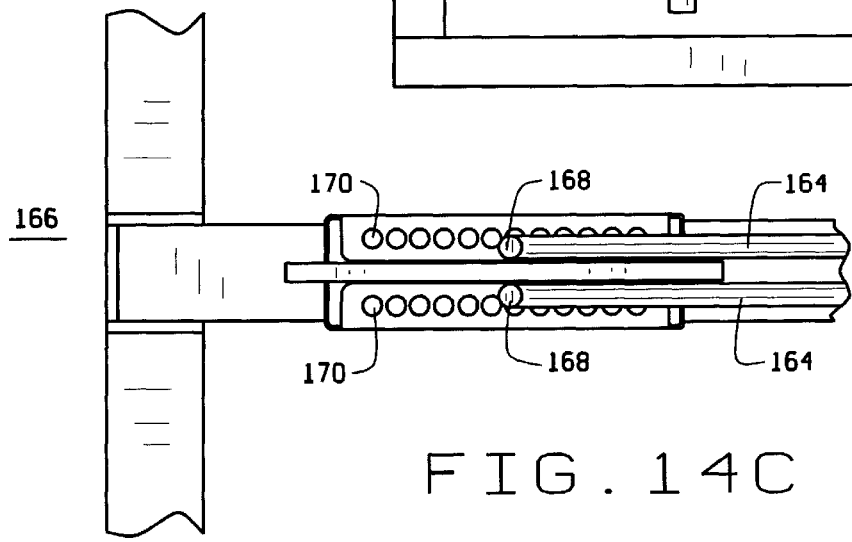
FIG. 14C is an enlarged top view of section 14C–14C in FIG. 14A, illustrating a locking mechanism for the adjustment arm extensions.
Figure 15:
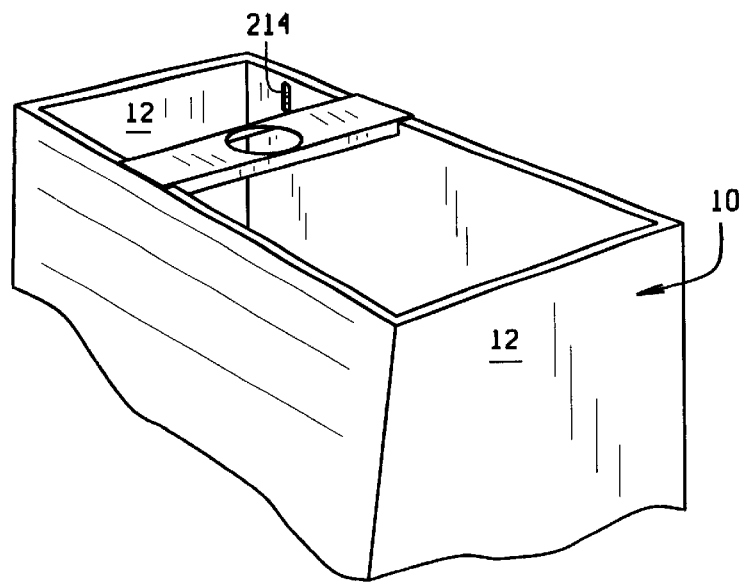
FIG. 15 is a perspective view of an alternate embodiment of the present invention.
Figure 16:
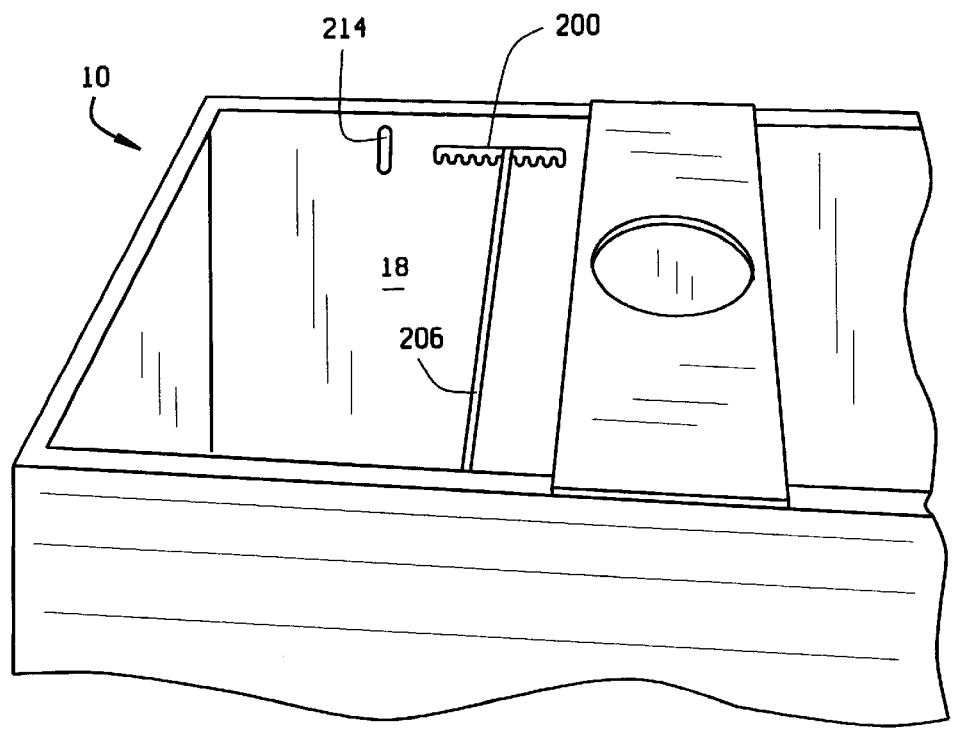
FIG. 16 is a top perspective view of the alternate embodiment shown in FIG. 15, illustrating the transverse rod and indexing rack.
Figure 17:
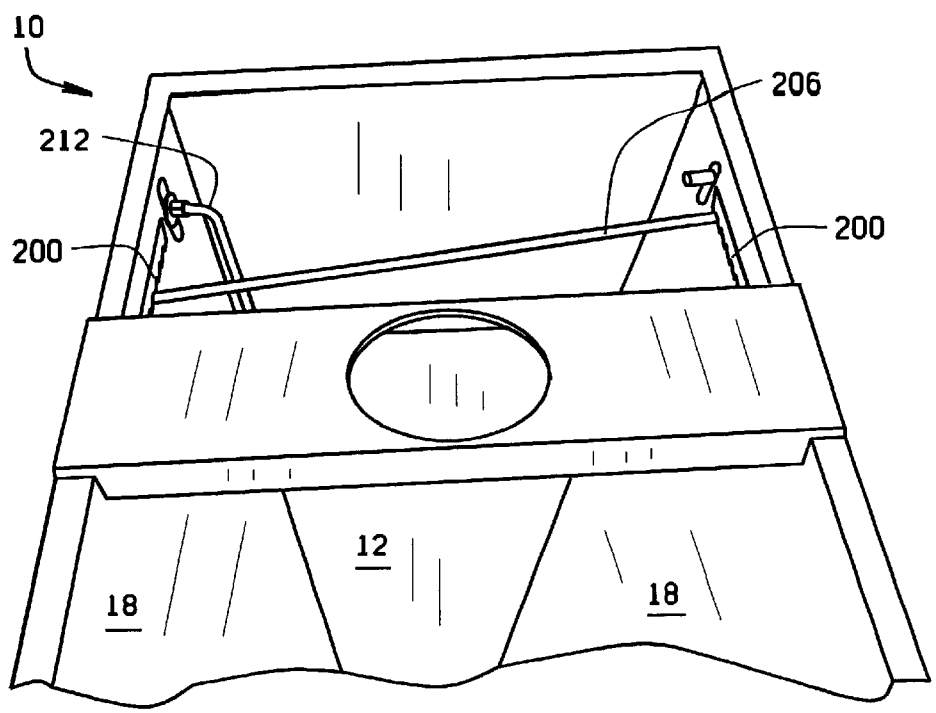
FIG. 17 is a second top perspective view of the embodiment shown in FIG. 16.

One skilled in the art will also readily recognize that numerous alterations in the design of the adjustment mechanism described above are possible within the scope of this invention. For example, the adjustment mechanism is not limited to including only two brackets 102 and a single adjustment arm 124 on each side of the feeder, but rather, may employ a number of brackets, and a plurality of interconnected adjustment arms, as is required by the length of the feeder. Similarly, as is shown in FIGS. 14A–14C, an pair of extension arms 164, 164 may extend through an end wall 12 of the feeder, and out into an aisle 166 located adjacent the feed pen in which the feeder 10 is placed. Extension arms 164, 164 permit an operator to adjust the size of the discharge openings from a remote location. Lateral motion of the extension arms is transferred to the adjustment arm 124 on each adjustment mechanism, raising or lowering the slideable gates 22, 22. To secure the gates in a desired position, the extension arms 164, 164, are provided with a locking tabs 168, 168 which seat within spaced receiving holes 170, disposed adjacent the aisle. Locking tab 168 serves as a functional replacement for selector tab 146 on the selector guide 136, which is eliminated in this alternate configuration.

Figure 18:
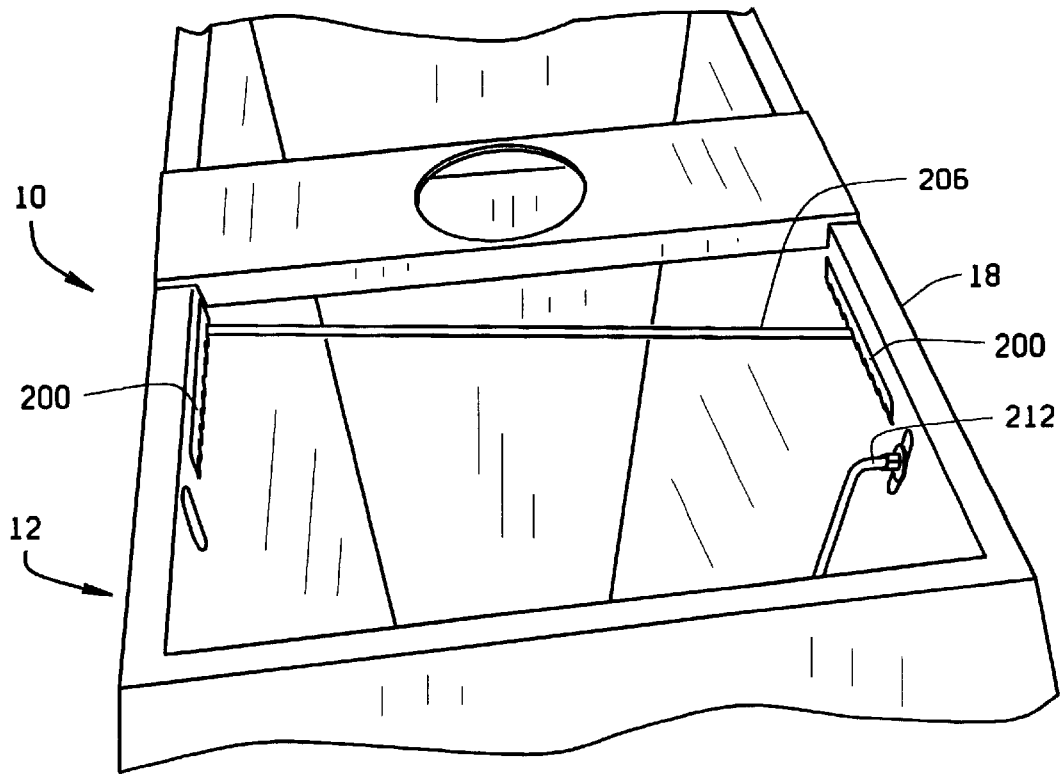
FIG. 18 is a view similar to FIG. 17, illustrating the independent placement of the transverse rod on opposite sides of the hopper.
Figure 19:
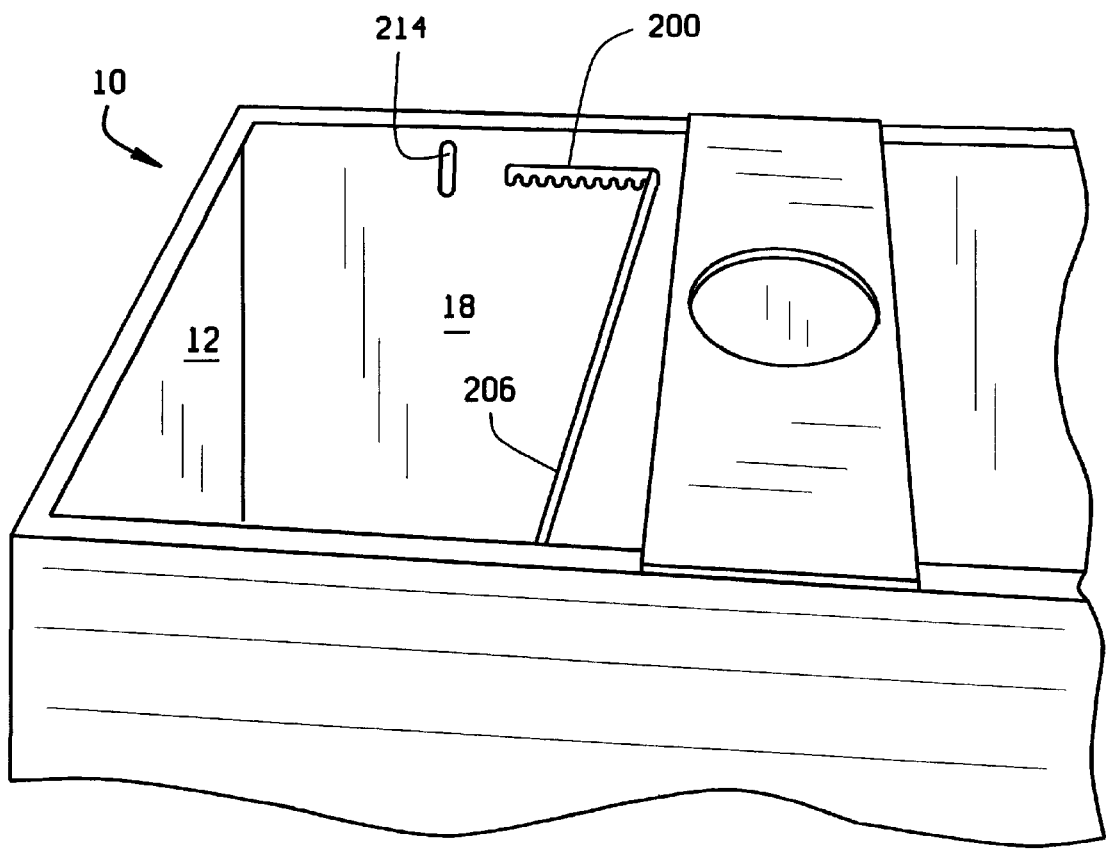
FIG. 19 is a top perspective view illustrating the independent placement of the transverse rod as seen in FIG. 18, from a different viewpoint.
Figure 20:
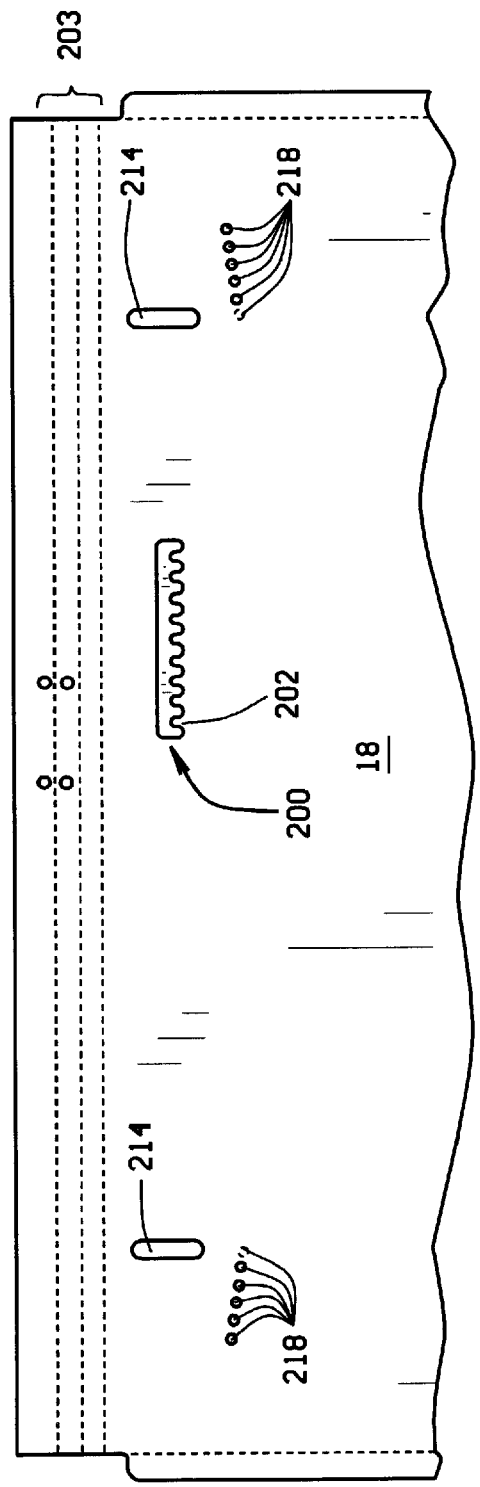
FIG. 20 is a side view of a single sheet of material comprising a side wall 18 of the embodiment of the present invention illustrated in FIG. 15.
Figure 21:
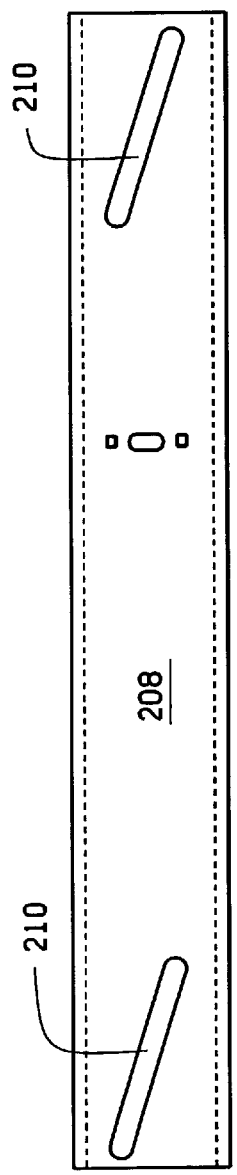
FIG. 21 is a side view of a horizontal cam track.
Figure 22:
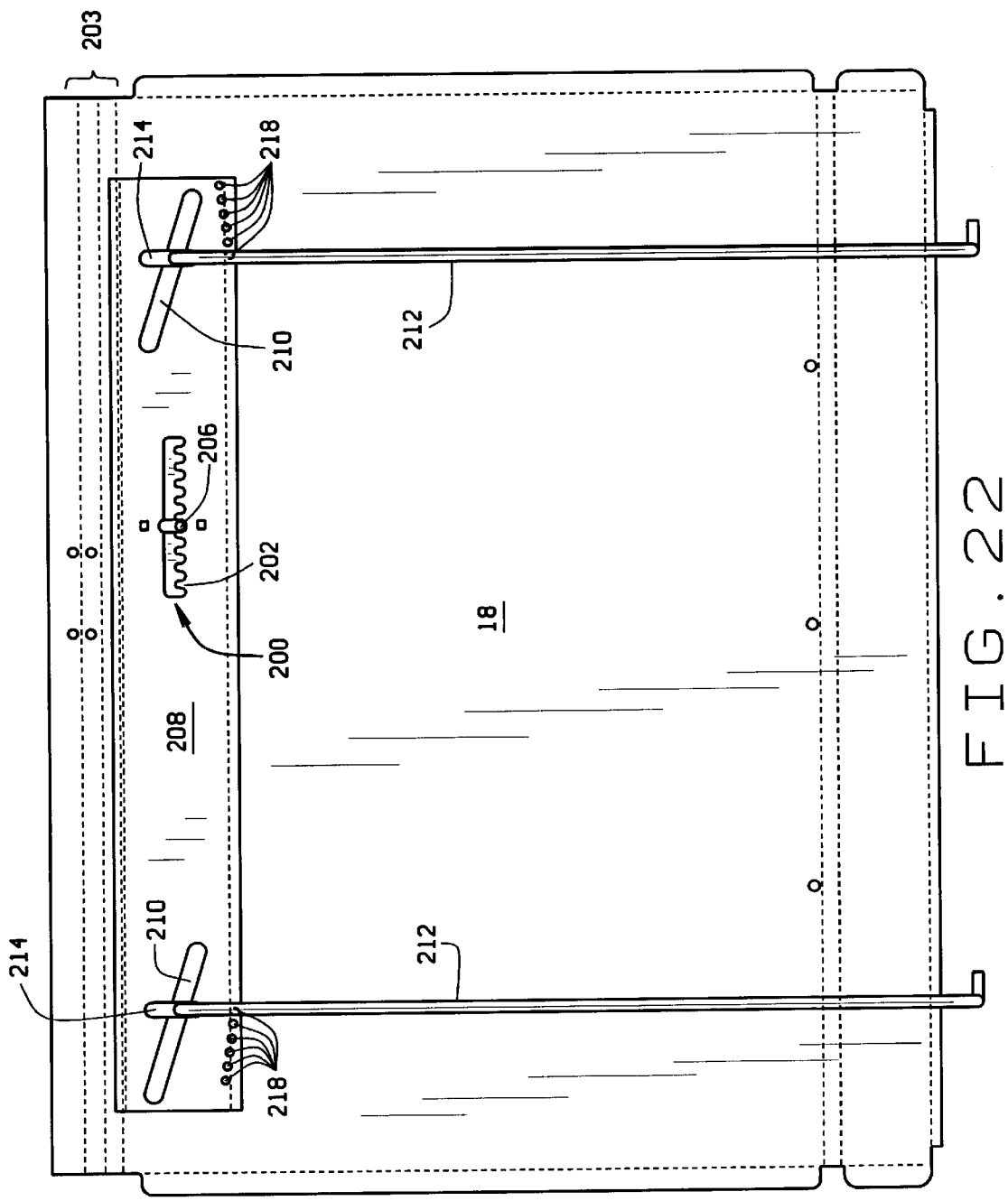
FIG. 22 is a side view similar to FIG. 20, illustrating the assembled side wall, adjustment mechanism, and connecting rods.
Figure 23:
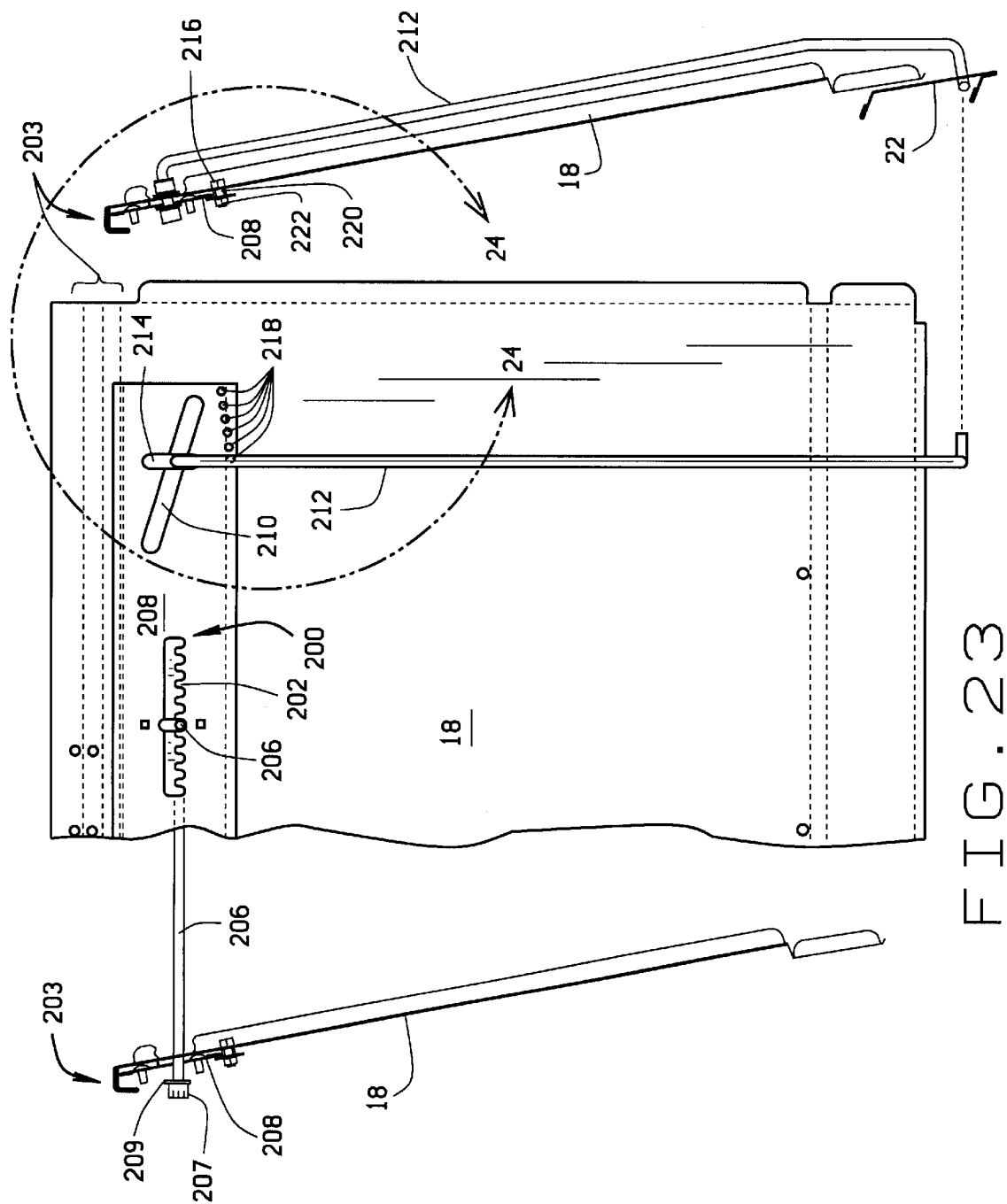
FIG. 23 is a combination view of a portion of FIG. 22.
Figure 24:
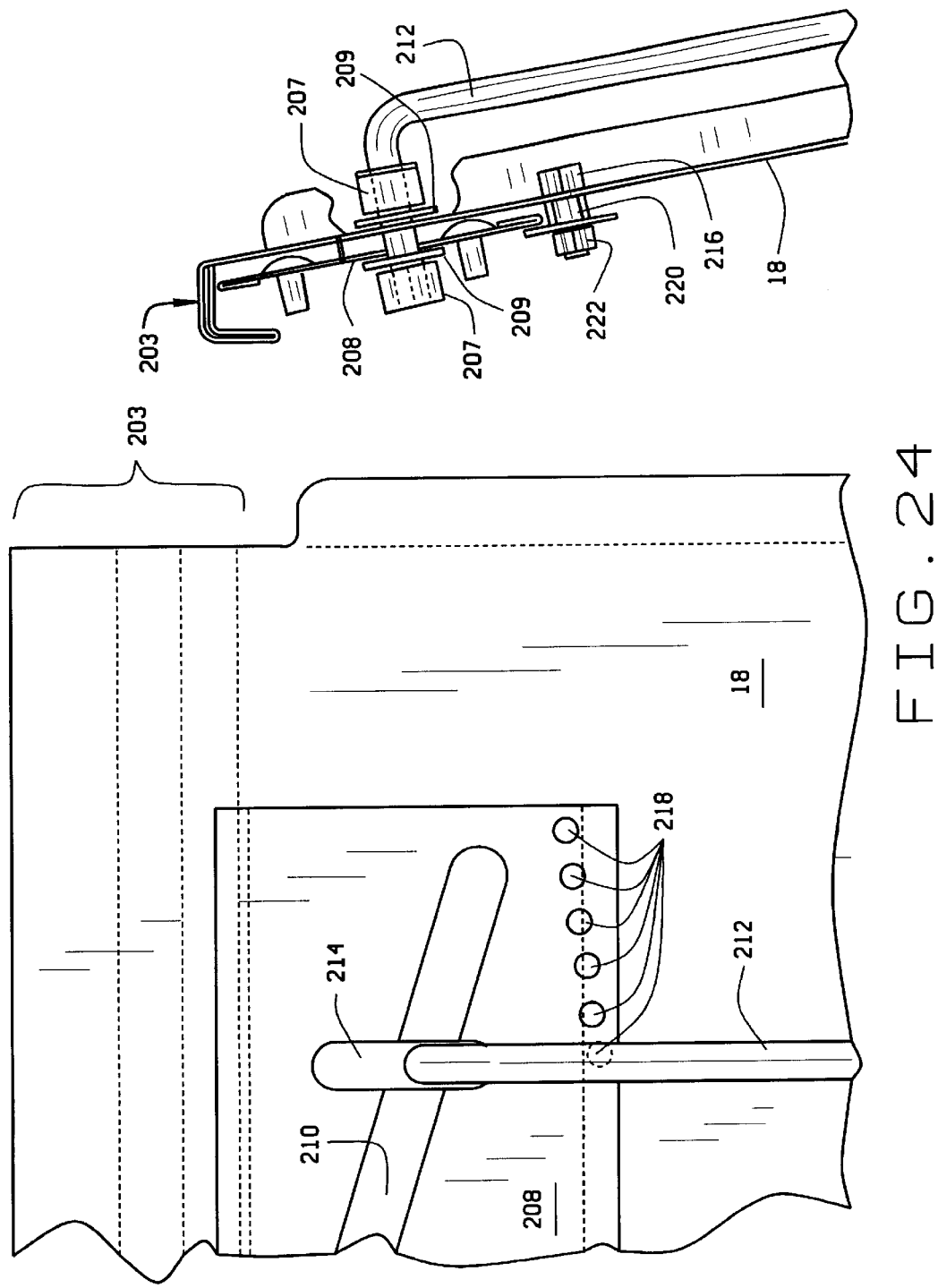
FIG. 24 is an enlarged portion of FIG. 23, illustrating the connections between the various components.

Turning now to FIGS. 15–24, a second preferred embodiment of the hog feeder 10 of the present invention is shown. Opposite sides of the feeder are constructed in identical fashion, and corresponding reference numbers are used to identify corresponding components. Only one side of the feeder is described in detail below. The slideable gate 22 and associated attachment mechanisms are constructed as described above, sized to regulate the flow of feed from the hopper 16 into the trough 14. As seen in FIG. 20, an indexing rack 200 is formed in the upper-region of the inclined sidewall 18, having spaced teeth 202 with a horizontal slot 204. The perforated lines in FIGS. 20–24 indicate locations along which the material forming the hog feeder is folded or bent to form flanges for the attachment of other components (not shown). At the upper edge, a plurality of bends form an upper retaining flange 203. A single transverse rod 206 extends between the two sidewalls 18, 18 of the feeder, and rests in the recesses between the teeth 202. On the outside of the side wall 18, there is a horizontal cam track 208, shown in FIG. 21, secured to the end of the rod 206, preferably by means of a retaining nut 207 and washer 209. The cam track 208 includes one or more sloped or angled cam slots 210 into which are engaged the elongated ends 211 of one or more connecting rods 212, retained within the slots 210 by additional retaining nuts 207 and washers 209. Each connecting rod 212 passes through a vertically aligned slot 214 in the sidewall 18, and extends downward for attachment to the slideable gate 22 by any conventional means, preferably by a hook or loop passing through the gate. The cam track 208 is restrained against upward vertical movement by interaction between the upper edge of the cam track and upper retaining flange 203 formed at the top of sidewall 18. Downward vertical motion of the cam track is prevented by means of a conventional threaded bolt 216, passing through a selector hole 218 in sidewall 18, and carrying a bushing 220 retained by a nut 222. The lower edge of cam track 208 is prevented from downward vertical motion by the interaction with the bushing 220. The degree of vertical motion which is permitted in the cam track, and correspondingly, slideable gate 22, is controlled by the choice of selector hole 218 through which bolt 216 is installed. Selecting a lower selector hole will permit a greater degree of movement of the cam track, and correspondingly, selecting an upper selector hole will essentially eliminate vertical motion. As such, the amount of feed released into the trough 14 from the hopper 16 by agitation of the slideable gate 22 by the feeding animal may be controlled.

By moving the transverse rod 206 in the horizontal direction, from one tooth position 202 to another, the horizontal cam track 208 secured to the transverse rod 206 is correspondingly moved in a horizontal direction relative to the upper regions of the hopper 16, and the upper ends of the connecting rods 212, which ride in the sloped cam tracks 210, 210 are shifted in a vertical direction, moving the slideable gate 22 in a corresponding direction. The motion of the upper ends of the connecting rods 212 is constrained against any horizontal movement by the vertically aligned slot 214. In this manner, by moving the transverse rod on one side, the corresponding slideable gate 22 is moved vertically so as to regulate the amount of feed dispensed from the hopper 16. It will be noted that the slope of the cam slots 210 may be varied so as to vary the amount of travel of the slideable gate. By moving the transverse rod in different directions on opposite sides of the feeder, as shown in FIGS. 18 and 19, the slideable gate 22 on one side of the feeder may be adjusted independently from the remaining gate, providing separate gate control. Furthermore, both slideable gates may be adjusted from either side of the feeder, eliminating the need for an operator to circle around the feeder to adjust gates on the opposite side. Additional embodiments may eliminate the teeth 202 in the rack 200, which may be replaced with an infinitely adjustable slot, and it may be possible to include a friction locking mechanism to retain the slide members (and slideable gates) in any desired fixed position along the path of movement of the slide member.

Figures 25, 26:
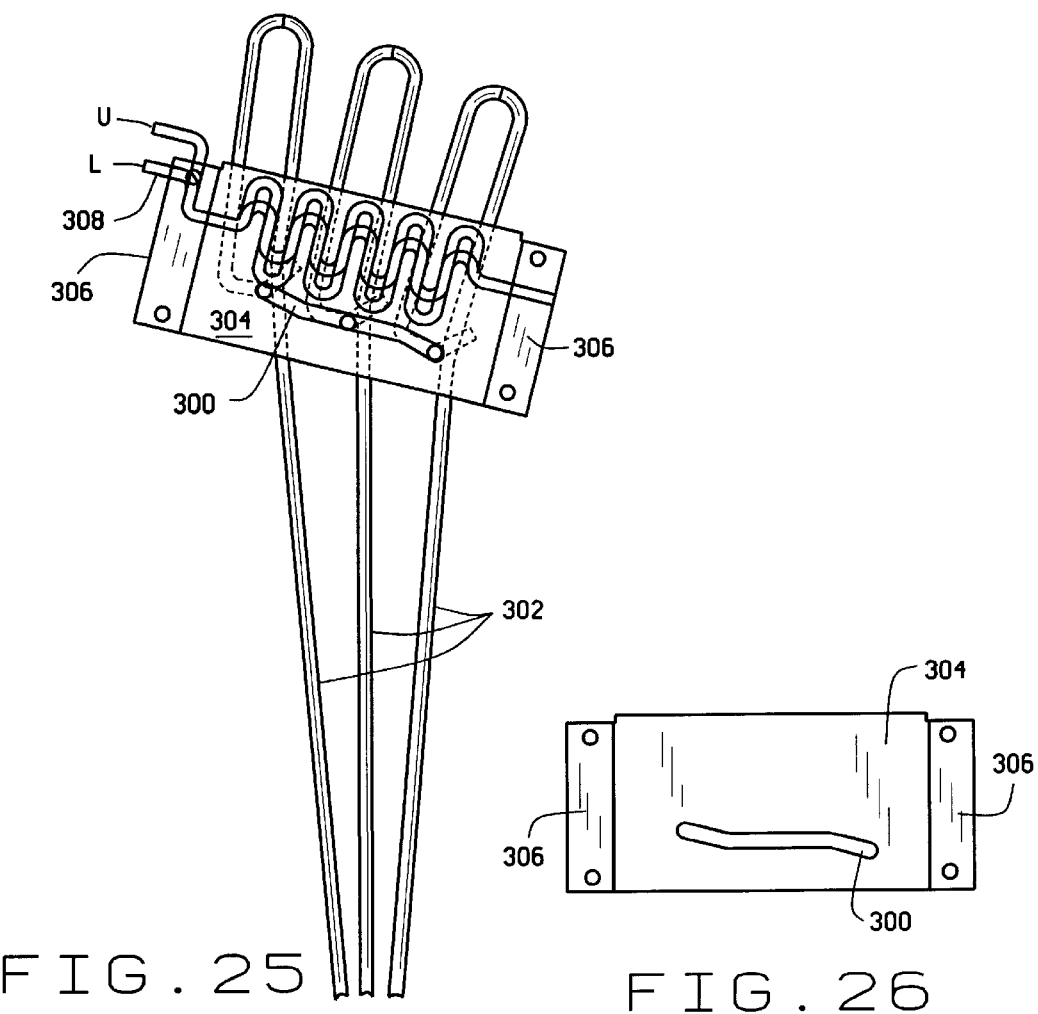
FIG. 25 is a partial view of a third preferred embodiment of the adjustment mechanism, incorporating the connecting rod in a variety of possible positions.
FIG. 26 is a mounting bracket for use with the embodiment shown in FIG. 25.
Figure 28:
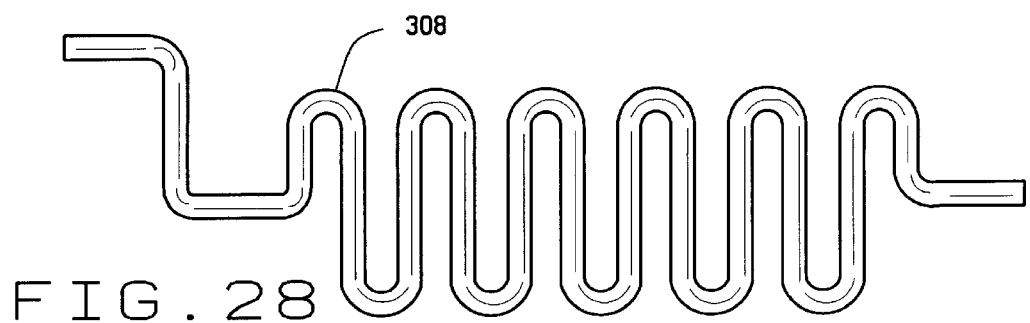
FIG. 28 is a locking bar employed in the embodiment shown in FIG. 25.

It will be understood that the horizontal slots in the slide members may be replaced by other types of cam mechanisms, and that the degree of agitation motion of the gates may be controlled by various bushing configurations. For example, the cam mechanism shown in FIGS. 25–28 employs a non-uniformly sloped cam track 300, in which is seated one end of a connecting rod 302, the opposite end of which is linked to a slideable gate 22 as described above. FIGS. 25 and 27 illustrate the connecting rod 302 in a variety of different positions, each corresponding to a different vertical displacement of the slideable gate. The cam track 300 is formed in a bracket 304, mounted to the side wall 18 of the hog feeder, by means of bolts (not shown) passing through holes formed in the peripheral flanges 306 of the bracket. When installed, the upper end of the connecting rod extends through slot 310 in the bracket, and is grasped by the operator to adjust the height of the slideable gates. FIG. 27 further illustrates the layout of the bracket prior to bending, with the dashed lines indicative of the locations of folds and bends necessary to form the desired flanges. FIG. 28 illustrates a locking rod 308 which may be employed to secure the connecting rod 302 at a variety of positions within the non-uniformly sloped cam track 300. The locking rod 308 is rotationally mounted within bracket 304, such that in a first and vertically aligned position U, the connecting rod 302 is unrestrained, and in a second and horizontally aligned position L, the convolutions of the locking rod interface with the connecting rod 302 to restrain it against any lateral movement. Any vertical motion of the connecting rod 302 is not transferred to the locking rod, but rather is restrained by the interaction of the bracket 304 and the end of the connecting rod 302 in the cam track.

While the embodiment shown in FIGS. 25–28 is illustrated in the context of a individual connecting rods 302 at each end of a slideable gate 22, one skilled in the art will readily recognize that the embodiment may be easily adapted with a linkage element (not shown) to 20 enable both sides of a gate to be simultaneously adjusted, or for gates on opposite sides of the feeder to be adjusted from a single location.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. In a hog feeder having a hopper for receiving and storing a supply of flowable, dry hog feed to be gravity dispensed from said hopper for consumption by hogs over a length of time, said hopper having a feed outlet through which feed from within the hopper is dispensed, and a control gate for regulating the flow of feed from said feed outlet, wherein the improvement comprises:

an adjustment for changing said control gate between a closed position in which said gate blocks the flow of feed from said feed outlet and a fully open position with one or more intermediate positions between said closed and fully open positions; and said adjustment comprising a first inclined cam slot associated with one end portion of said gate, said first cam slot being in a fixed relation with respect to said hopper, a first cam follower member disposed in said first cam slot, a first operating member interconnecting said first cam follower member and said one end portion of said cam follower member is moved within said cam slot, said one end portion of said gate is moved toward or away from its closed and open positions, and a second inclined cam slot associated with the other end portion of said gate, said second cam slot being in a fixed relation with respect to said hopper, a second cam follower member disposed in said second cam slot a second operating member interconnecting said second cam follower member and said other end portion of said gate such that as said second cam follower member is moved within said second cam slot, said other end of said gate is moved toward or away from its closed and open positions, and an arm interconnecting said first and second cam follower members such that by effecting movement of said arm substantially simultaneous adjustment of both ends of said gate is effected.

2. In a hog feeder as set forth in claim 1 wherein each of said cam slots has a plurality of fixed positions therealong for holding its respective said cam follower member in a first position such that said control gate is in its closed position, in a second position in which said control gate is in its fully open position, and in one or more intermediate positions such that with its said cam follower member received in one or more of said intermediate positions, said control gate is in a corresponding intermediate position such that the flow of feed from said feed outlet may be controlled.

3. In a hog feeder as set forth in claim 2 wherein said fixed positions along each of said cam slots comprises a plurality of notches for receiving its said respective cam follower member and for holding said respective cam follower therein.

4. In a hog feeder as set forth in claim 2 wherein said hopper has a second feed outlet, said second feed outlet dispensing feed therefrom on the side of said feeder opposite the first said outlet, said second outlet having a second control gate associated with said second outlet for regulating the flow of feed from said second outlet, and an adjustment for changing said second control gate between a closed position in which said second control gate blocks the flow of feed therefrom and a fully open position with one or more intermediate positions between said closed and fully open positions, an adjustment for changing said second gate between said closed and fully open positions comprising a first inclined cam slot disposed in a fixed relation with respect to said hopper, first cam follower member disposed in said first cam slot, a first operating member interconnecting said first cam follower member and said one end portion of said second control gate such that as said first cam follower member is moved within said first cam slot, said one end portion of said second control gate is moved toward or away from its closed and open positions, and a second inclined cam slot disposed associated with the other end portion of said second control gate, said second cam slot being in a fixed relation with respect to said hopper, a second cam follower member disposed in said second cam slot, a second operating member interconnecting said second cam follower member and said other end portion of said second control gate such that as said second cam follower member is moved within said second cam slot, said other end of said second control gate is moved toward or away from its closed and open positions, and an arm interconnecting said first and second cam follower members such that by effecting movement of said arm substantially simultaneous adjustment of both ends of said gate second is effected, and a bar spanning said hopper and operatively joining said cam followers of each of said adjustments for said first and second control gates such that each control gate may be controlled independently of the other by manually grasping said bar and selectively moving each of said cam followers along its respective cam slot such that each control gate is in its desired position thereby to regulate the flow of feed from each of said control gates.

5. A hog feeder having a feed hopper comprising a pair of spaced, downwardly converging hopper slope sheets, a pair of feed outlets at the bottom of said hopper from which feed is dispensed for consumption by the hogs on each side of said feeder, a gate for each of said feed outlets, and an operating mechanism for each of said feed gates operable independently of one another for movement of each said gate between a closed position in which feed is blocked from flowing from its respective said feed outlet and a fully open position with one or more intermediate positions between said closed and fully open position, said operating mechanism for each said gate comprising a cam slot disposed in general horizontal relation to said feeder, a cam follower movable within said cam slot, and an operating member linking said cam follower and said gate for effecting movement of said gate between its fully open, intermediate, and closed positions, said cam slot having a cam surface inclined with respect to the horizontal, said cam follower being engageable by cam surface for raising or lowering said cam follower within said cam slot, said cam slot having a plurality of notches therein for receiving said cam follower, said notches corresponding to said closed, fully open and one or more intermediate positions, said cam slots being generally parallel to one another and being on opposite sides of said hopper, a bar spanning between said operating mechanisms for each of said gates with the ends of said bar being connected to each of said operating mechanisms such that by manually grasping said bar, movement of each said gate may be effected independently of one another.

6. A hog feeder having a hopper for receiving and storing a supply of a dry, flowable hog feed to be gravity dispensed from said hopper for consumption by hogs over a length of time, said hopper having an elongate feed outlet through which feed from within said hopper is dispensed, and an elongate gate for regulating the flow of feed from said feed outlet, an adjustment for changing said gate between a closed position in which said gate blocks the flow of feed from said feed outlet and a fully open position with one or more intermediate positions between said fully open and said closed positions, said adjustment comprising a first inclined cam slot at one end of said gate and a second inclined cam slot at the other end of said gate, a first cam follower disposed in said first cam slot and a second cam follower disposed in said second cam slot, and a link between said first and second cam followers such that movement of said link operates said first and second cam followers in their respective cam slots so as to substantially simultaneously move both ends of said gate substantially the same amount.

7. A hog feeder having a hopper for receiving and storing a supply of a dry, flowable hog feed to be gravity dispensed from said hopper for consumption by hogs over a length of time, said hopper having an elongate feed outlet through which feed from within said hopper is dispensed, and an elongate gate for regulating the flow of feed from said feed outlet, an adjustment for changing said gate between a closed position in which said gate blocks the flow of feed from said feed outlet and a fully open position with one or more intermediate positions between said fully open and said closed positions, said adjustment comprising a first actuator at one end of said gate and a second actuator at the other end of said gate, and a link between said first and second actuators such that movement of said link operates said first and second actuators so as to substantially simultaneously move both ends of said gate substantially the same amount.

* * * * *

UNITED STATES PATENT AND TRADEMARK OFFICE
CERTIFICATE OF CORRECTION

PATENT NO. : 6,253,705 B1  
APPLICATION NO. : 09/322620  
DATED : July 3, 2001  
INVENTOR(S) : Eugene B. Pollock and Hubert Vern Hopley Page 1 of 1

It is certified that error appears in the above-identified patent and that said Letters Patent is hereby corrected as shown below:

On the title page, item [57]:  
In the ABSTRACT  
    Replace "filly"  
    with --fully--

Col. 1, line 37  
    Replace "cros-member"  
    with --cross-member--

Col. 6, line 14  
    Replace "the 5 slidable"  
    with --the slidable--

Col. 10, line 47  
    Replace "to 20 enable"  
    with --to enable--

Col. 11, line 10  
    Replace "said cam"  
    with --said gate such that as said first cam--

Col. 11, line 11  
    Replace "said cam"  
    with --said first cam--

Signed and Sealed this

Twenty-second Day of January, 2008

JON W. DUDAS  
*Director of the United States Patent and Trademark Office*